(12) United States Patent
Sun et al.

(10) Patent No.: US 10,505,192 B2
(45) Date of Patent: Dec. 10, 2019

(54) POSITIVE ELECTRODE ACTIVE MATERIAL AND RECHARGEABLE BATTERY INCLUDING THE SAME

(71) Applicants: IUCF-HYU (INDUSTRY-UNIVERSITY COOPERATION FOUNDATION HANYANG UNIVERSITY), Seoul (KR); ENERCERAMIC INC., Seoul (KR)

(72) Inventors: Yangkook Sun, Seoul (KR); Chongseung Yoon, Seoul (KR); Gangjun Park, Seoul (KR); Jangwook Park, Incheon (KR)

(73) Assignees: IUCF-HYU (INDUSTRY-UNIVERSITY COOPERATION FOUNDATION HANYANG UNIVERSITY), Seoul (KR); ENERCERAMIC INC., Seoul (KR)

( * ) Notice: Subject to any disclaimer, the term of this patent is extended or adjusted under 35 U.S.C. 154(b) by 147 days.

(21) Appl. No.: 15/666,000

(22) Filed: Aug. 1, 2017

(65) Prior Publication Data
US 2017/0338488 A1 Nov. 23, 2017

Related U.S. Application Data

(63) Continuation of application No. PCT/KR2016/001158, filed on Feb. 2, 2016.

(30) Foreign Application Priority Data

Feb. 2, 2015 (KR) .................. 10-2015-0016359

(51) Int. Cl.
*H01M 4/52* (2010.01)
*H01M 4/525* (2010.01)
(Continued)

(52) U.S. Cl.
CPC ............ *H01M 4/525* (2013.01); *C01G 53/00* (2013.01); *C01G 53/50* (2013.01); *H01M 4/505* (2013.01);
(Continued)

(58) Field of Classification Search
CPC .... H01M 4/525; H01M 4/505; H01M 10/052; H01M 10/0525; H01M 2004/028; C01G 53/00; C01G 53/50
(Continued)

(56) References Cited

U.S. PATENT DOCUMENTS

| | | | |
|---|---|---|---|
| 2014/0127585 A1* | 5/2014 | Kojima | H01M 2/043 429/231.8 |
| 2014/0158932 A1 | 6/2014 | Sun et al. | |
| 2014/0227599 A1* | 8/2014 | Nishide | H01M 4/131 429/231.3 |

FOREIGN PATENT DOCUMENTS

| | | |
|---|---|---|
| JP | 2000-149942 A | 5/2000 |
| JP | 2006-236762 A | 9/2006 |

(Continued)

OTHER PUBLICATIONS

Machine translation of JP 2000-149942 (no date).*
(Continued)

*Primary Examiner* — Amanda C. Walke
(74) *Attorney, Agent, or Firm* — Sughrue Mion, PLLC

(57) ABSTRACT

A lithium metal composite oxide includes a primary particle having a hexagonal crystal structure, and a primary particle having a cubic crystal structure.

17 Claims, 25 Drawing Sheets

(51) Int. Cl.
   *C01G 53/00* (2006.01)
   *H01M 4/505* (2010.01)
   *H01M 10/0525* (2010.01)
   *H01M 4/02* (2006.01)

(52) U.S. Cl.
   CPC ...... *C01P 2002/01* (2013.01); *C01P 2002/30* (2013.01); *C01P 2002/52* (2013.01); *C01P 2004/50* (2013.01); *C01P 2004/61* (2013.01); *C01P 2006/40* (2013.01); *H01M 10/0525* (2013.01); *H01M 2004/028* (2013.01)

(58) Field of Classification Search
   USPC ...................................................... 429/231.1
   See application file for complete search history.

(56) References Cited

FOREIGN PATENT DOCUMENTS

| | | |
|---|---|---|
| JP | 2013-222503 A | 10/2013 |
| JP | 2014-053262 A | 3/2014 |
| KR | 10-2013-0138147 A | 12/2013 |

OTHER PUBLICATIONS

Machine translation of JP 2006-236762 (no date).*
Machine translation of KR 10-2013-0065711 (no date).*
International Search Report of PCT/KR2016/001158 dated May 13, 2016.

\* cited by examiner

[Fig. 1]
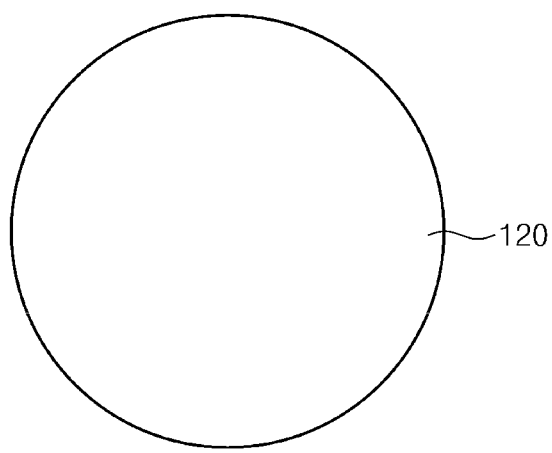

[Fig. 2]
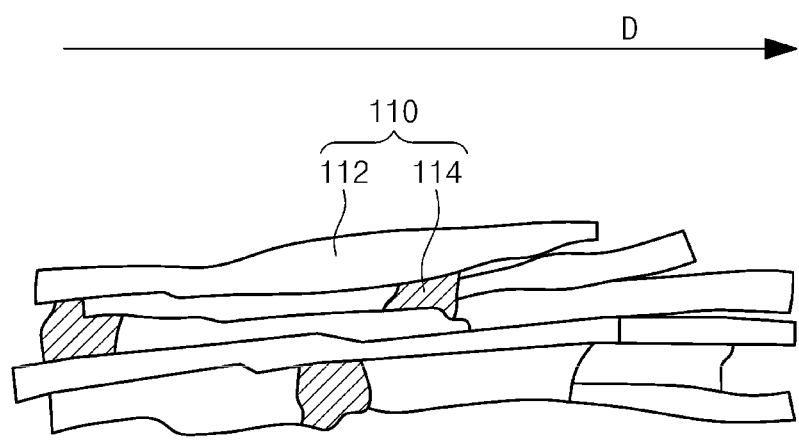

[Fig. 3]
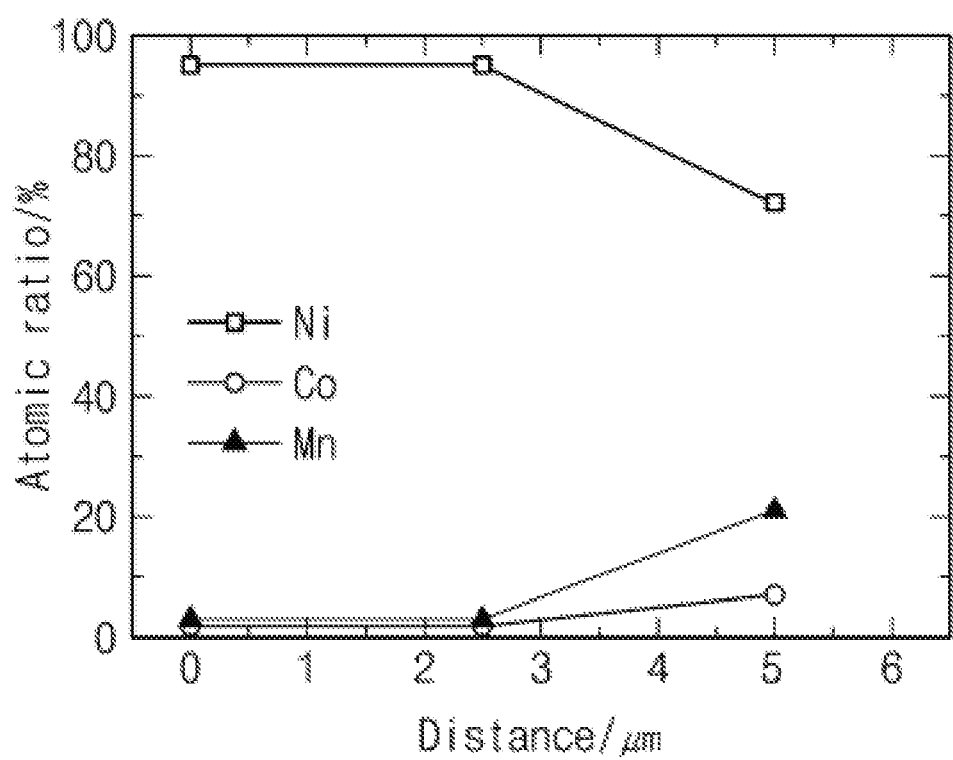

[Fig. 4]
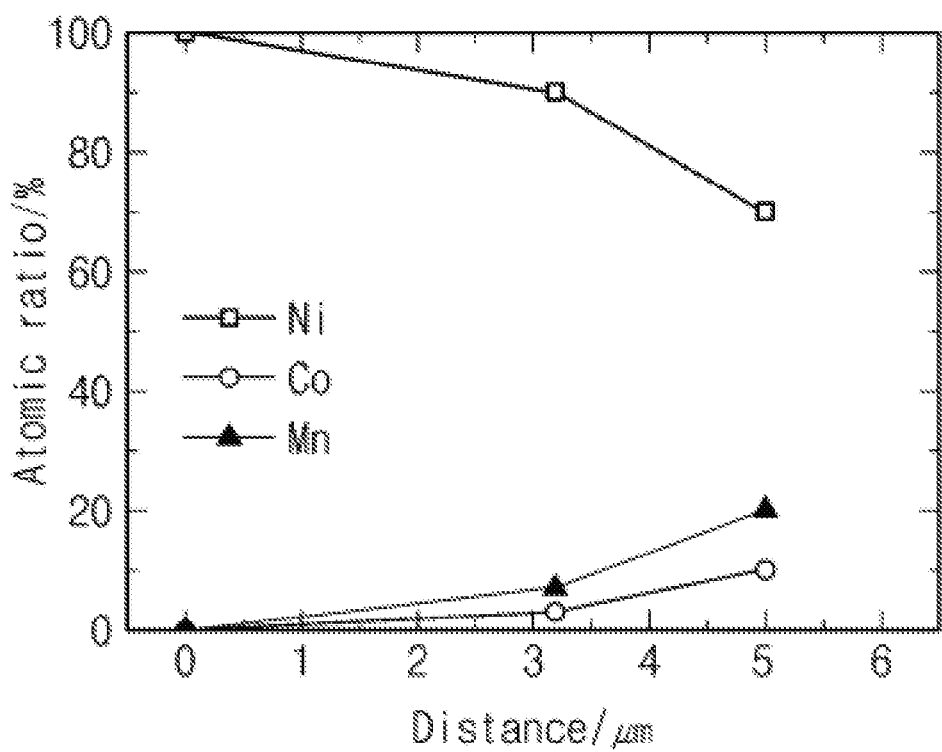

[Fig. 5a]
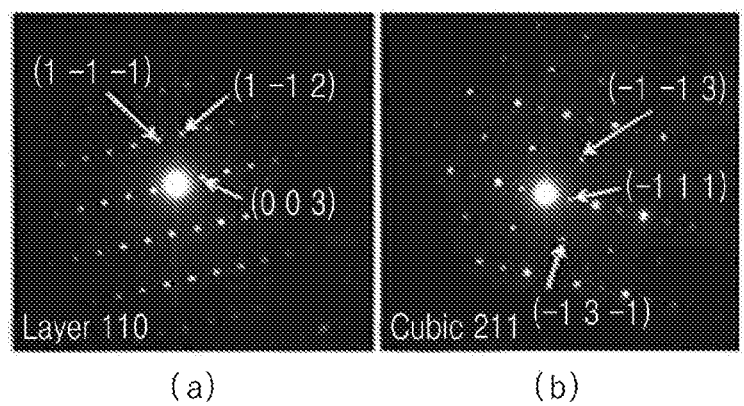
(a) (b)
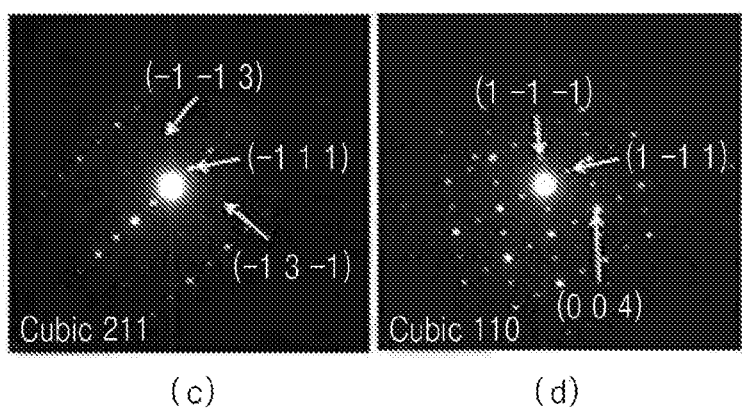
(c) (d)
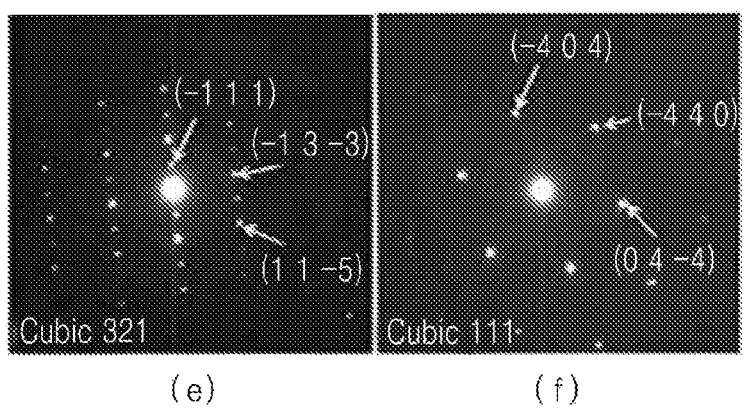
(e) (f)

【Fig. 5b】
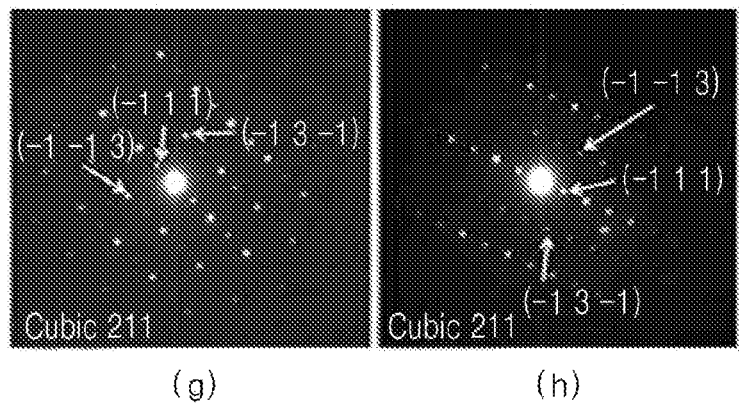
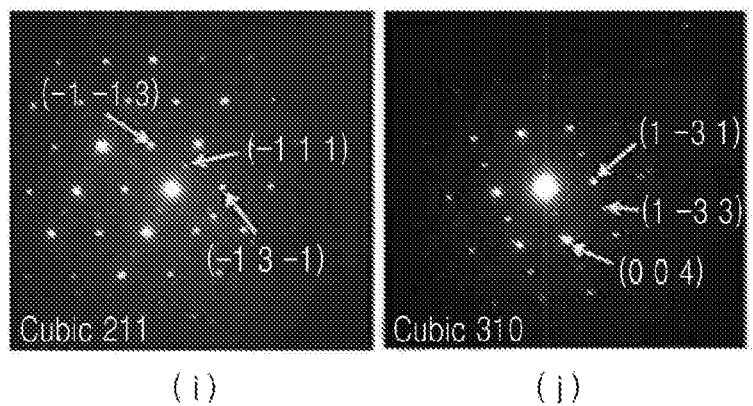

[Fig. 6]
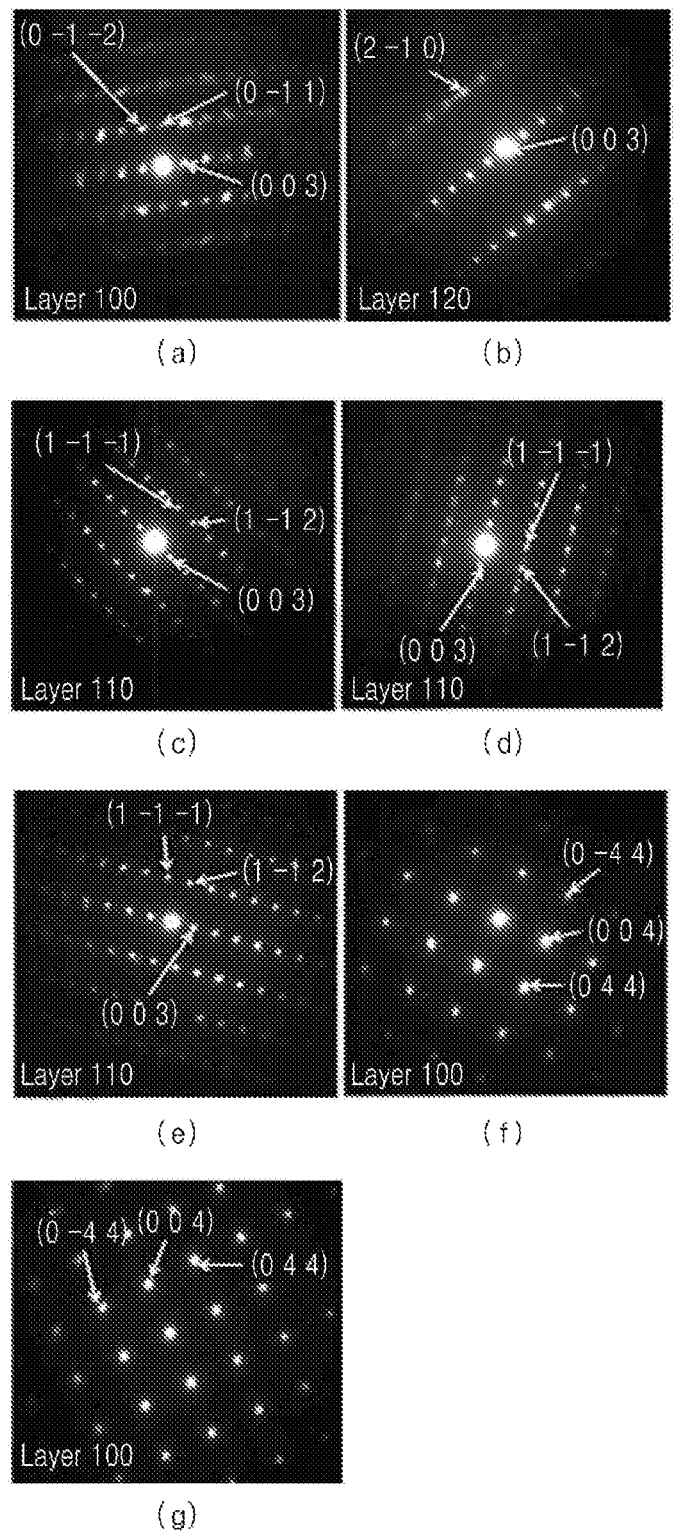

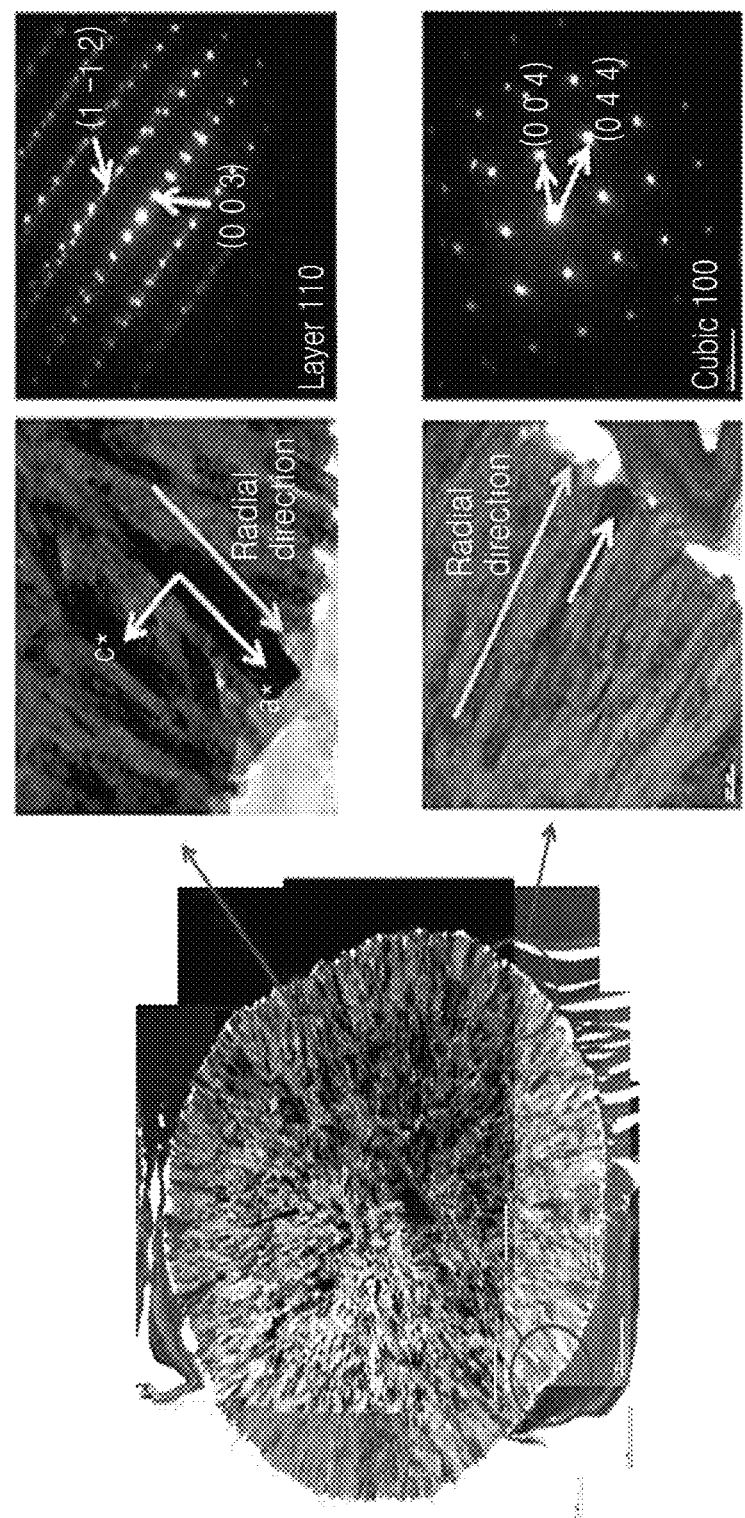
[Fig. 7]

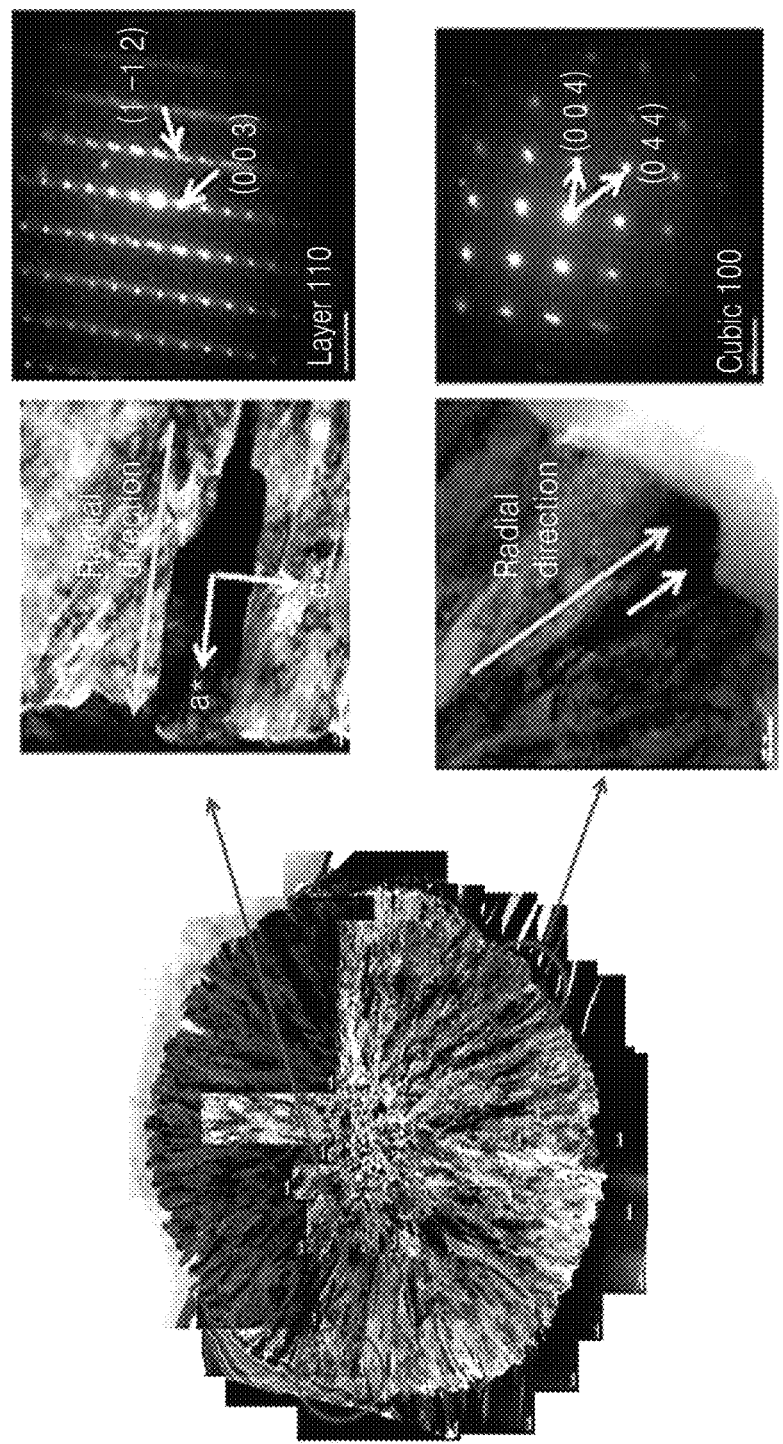
[Fig. 8]

[Fig. 9]
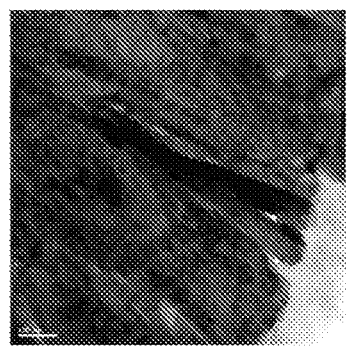
(a)
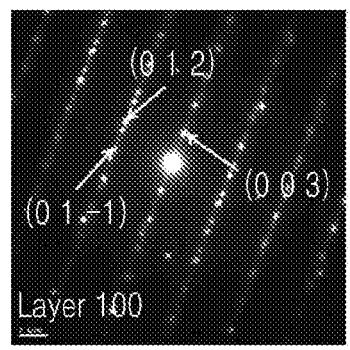
(b)
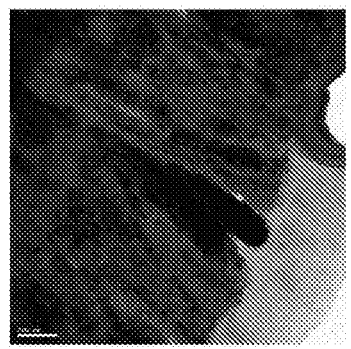
(c)
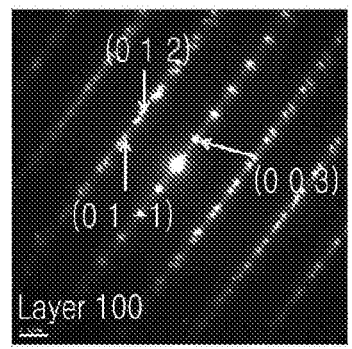
(d)

【Fig. 10a】
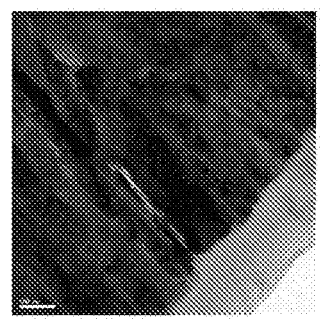
(a)
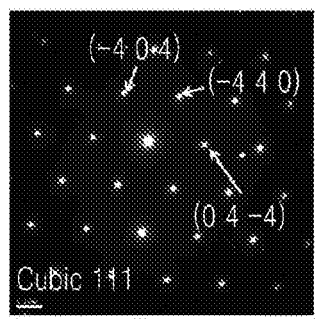
(b)
(c)
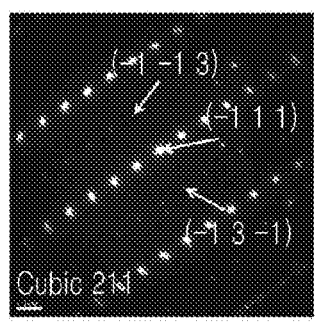
(d)
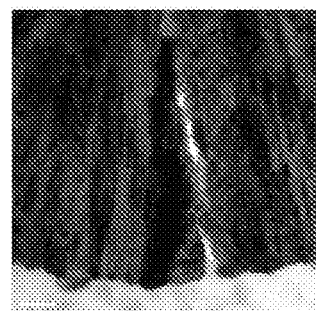
(e)
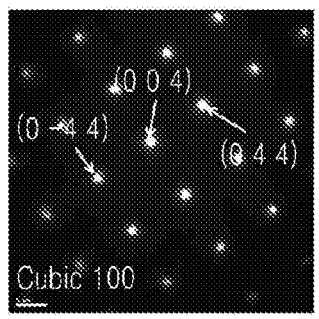
(f)
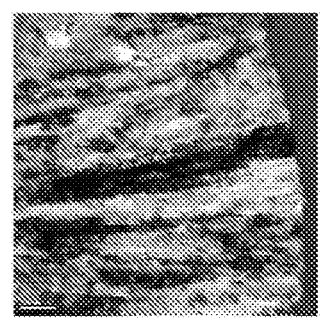
(g)
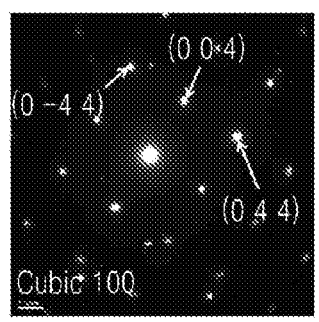
(h)

[Fig. 10b]
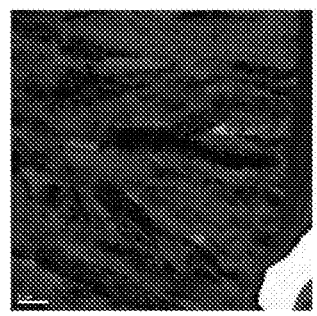
(i)
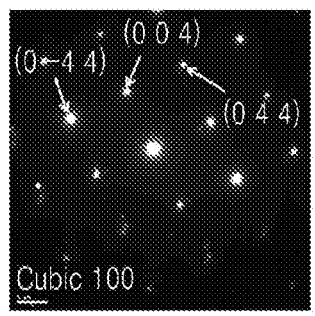
(j)
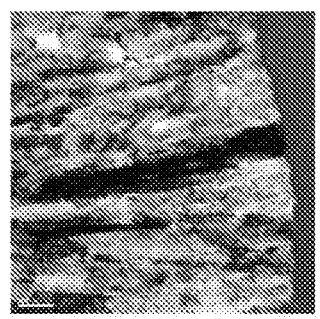
(k)
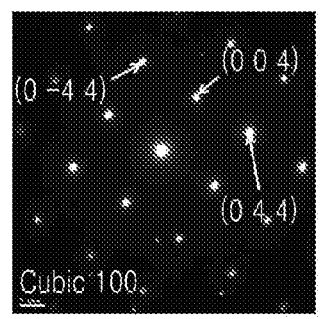
(l)
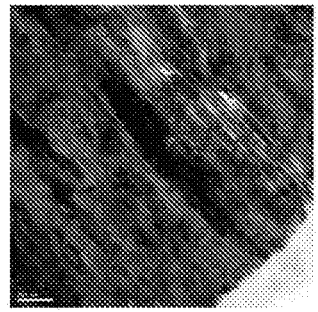
(m)
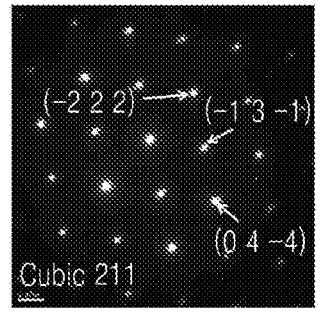
(n)
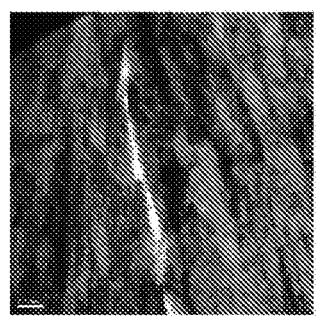
(o)
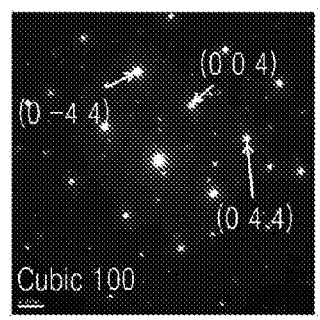
(p)

[Fig. 11]
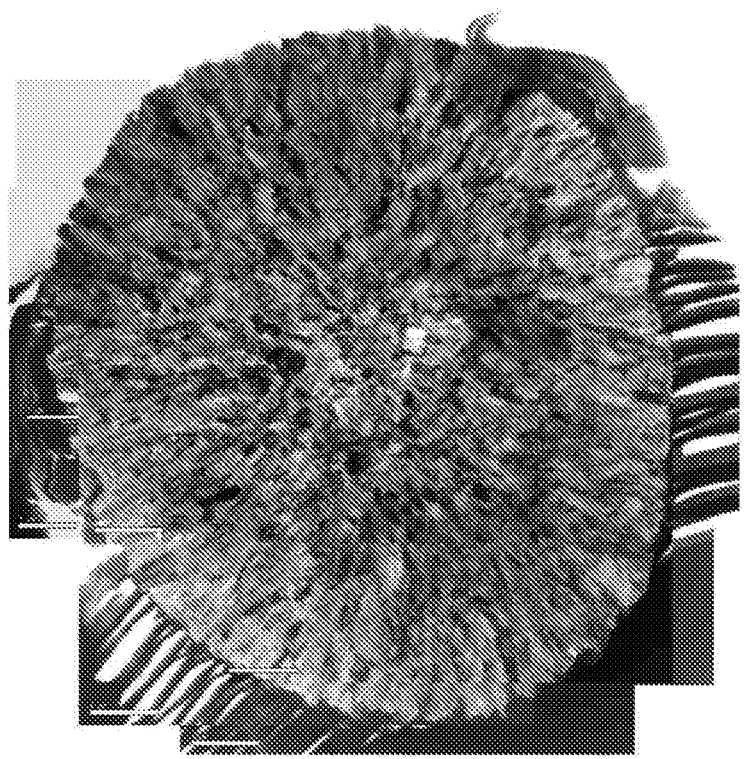

[Fig. 12]
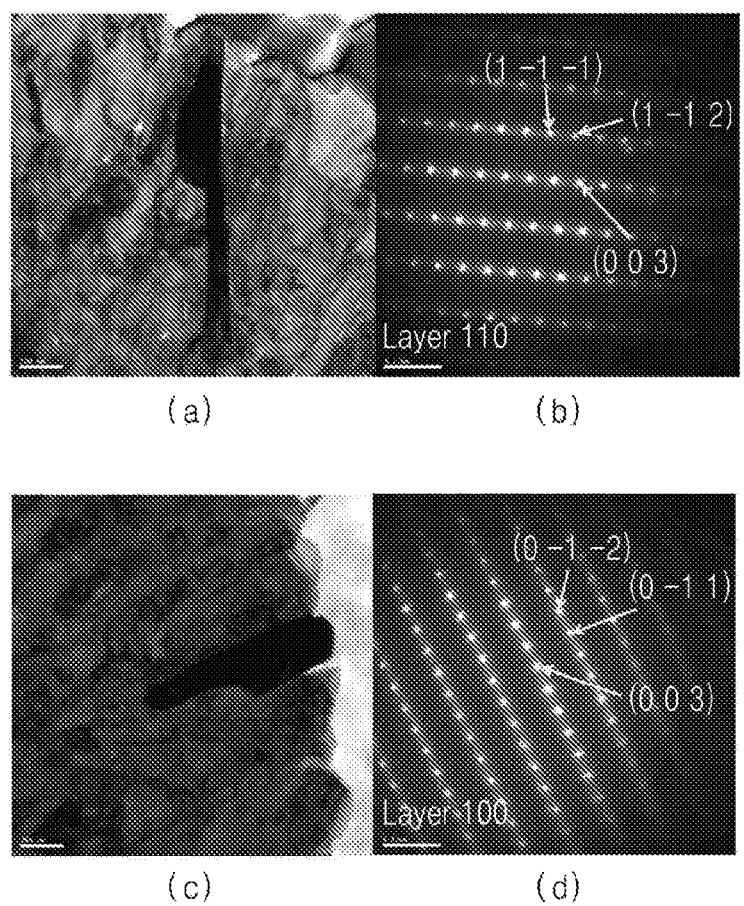

[Fig. 13]
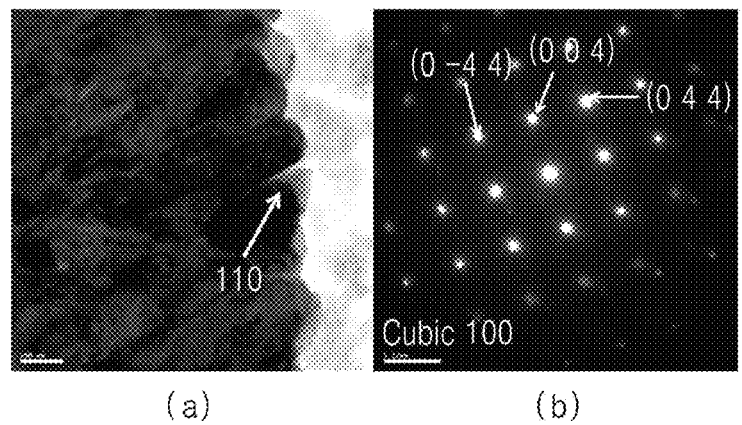
(a)  (b)
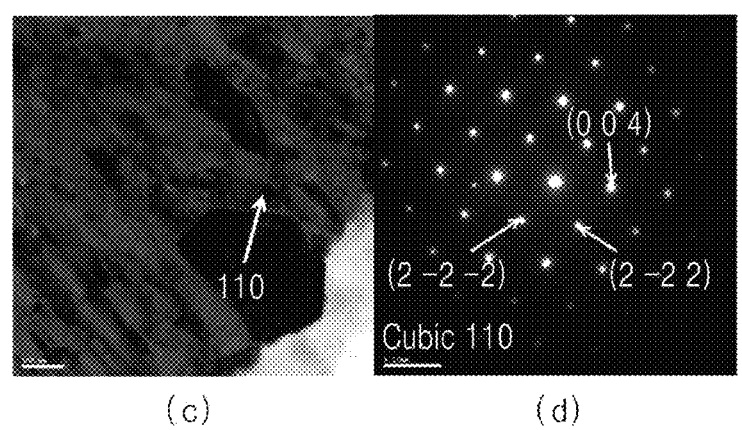
(c)  (d)
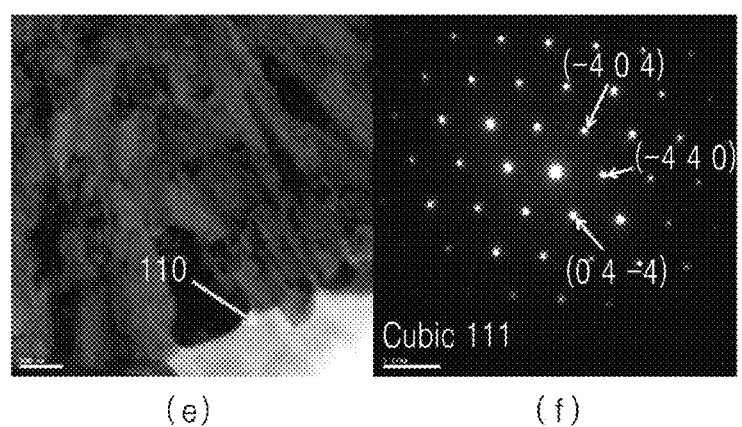
(e)  (f)

【Fig. 14a】
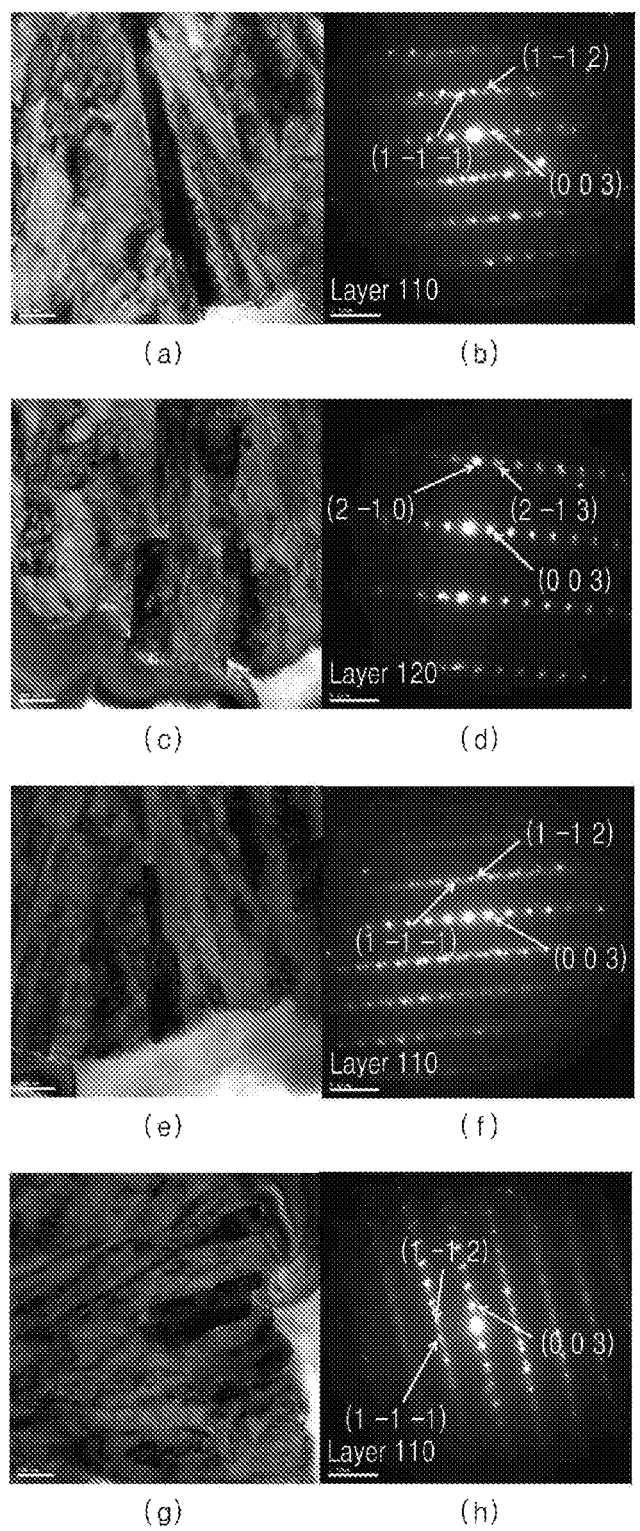

[Fig. 14b]
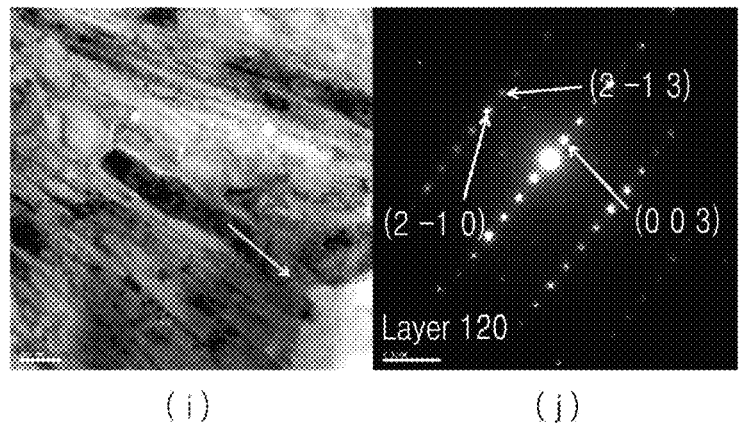
(i)  (j)
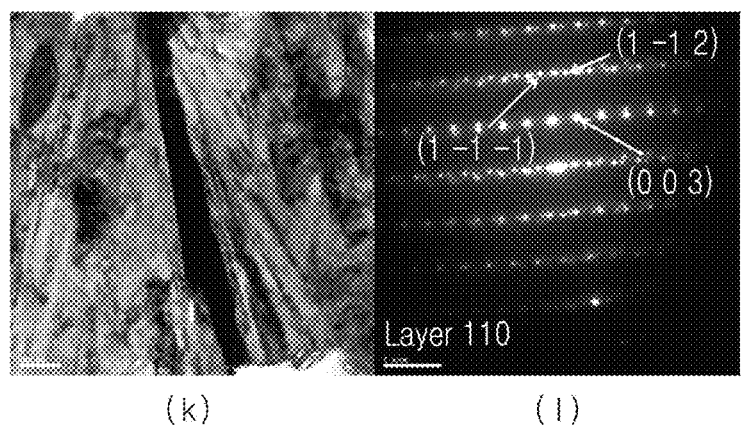
(k)  (l)
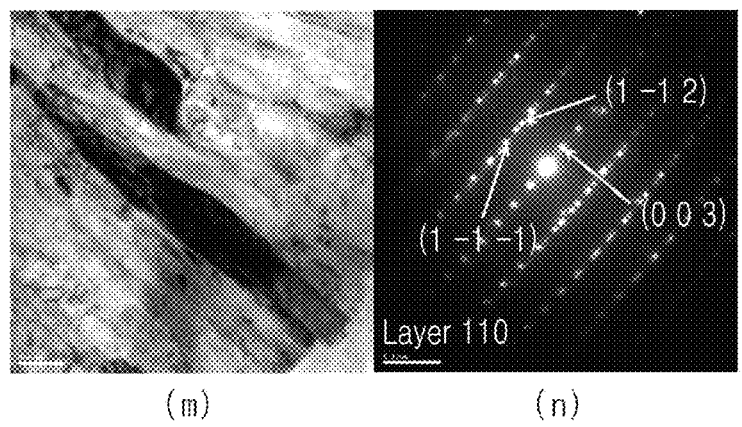
(m)  (n)

[Fig. 15]
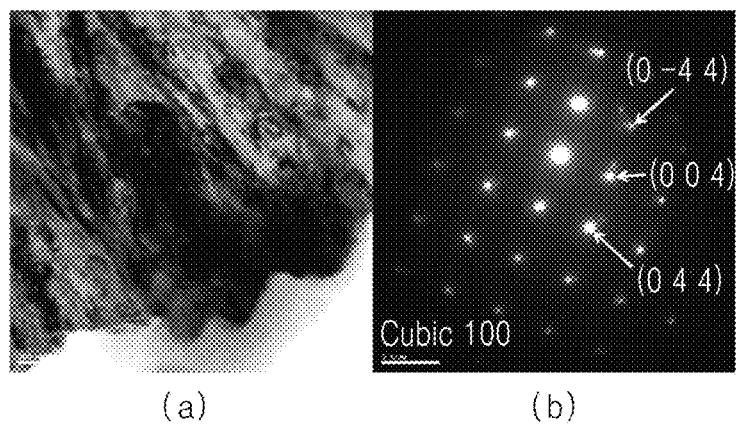
(a) (b)
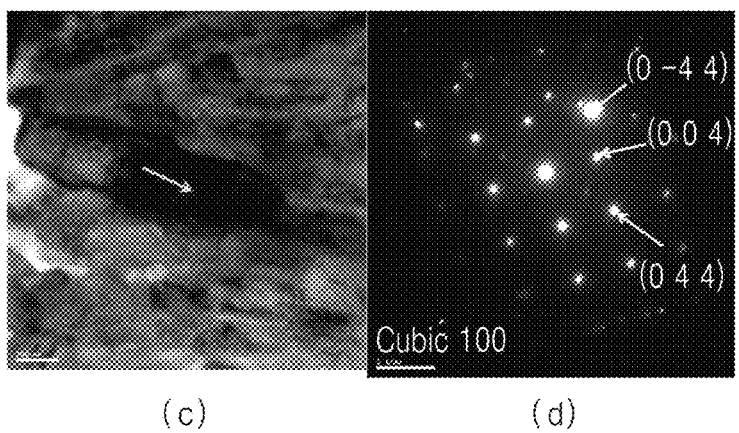
(c) (d)

[Fig. 16]
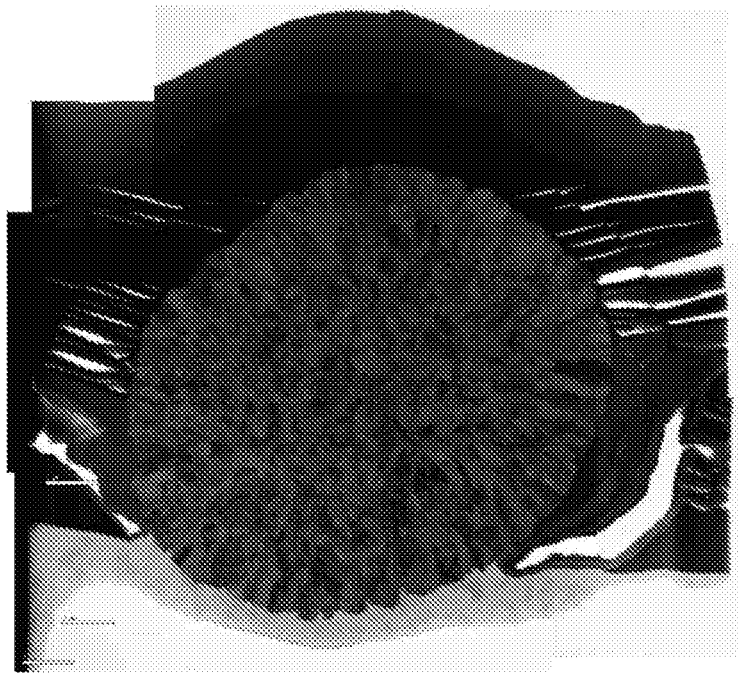

[Fig. 17]
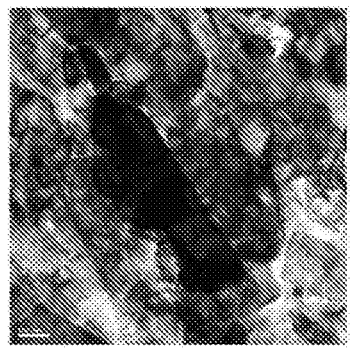
(a)
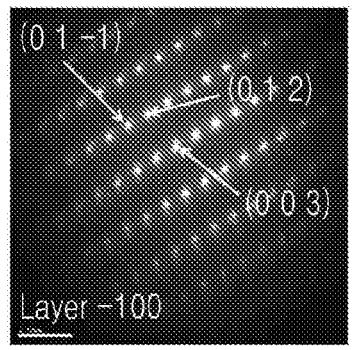
(b)
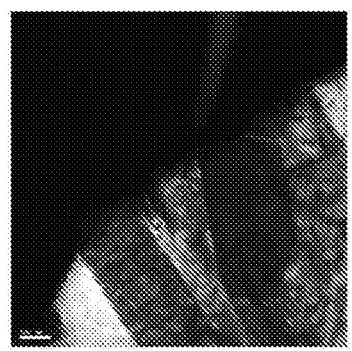
(c)
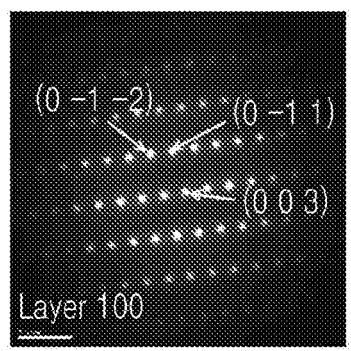
(d)
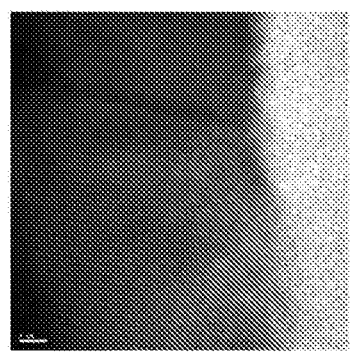
(e)
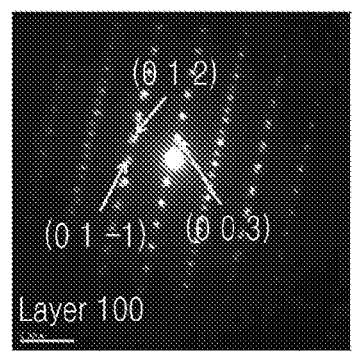
(f)

[Fig. 18a]
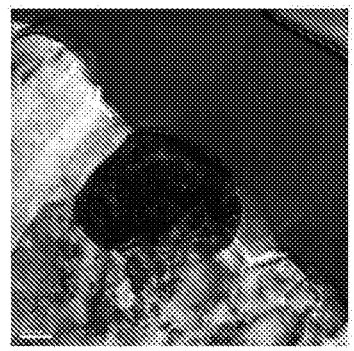
(a)
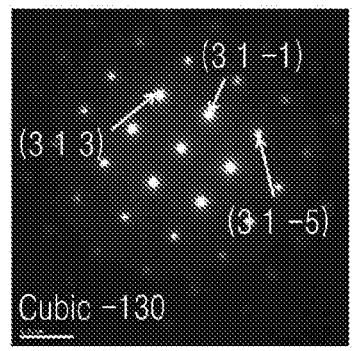
(b)
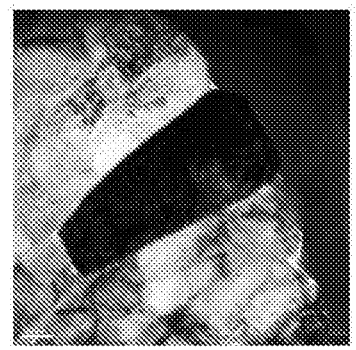
(c)
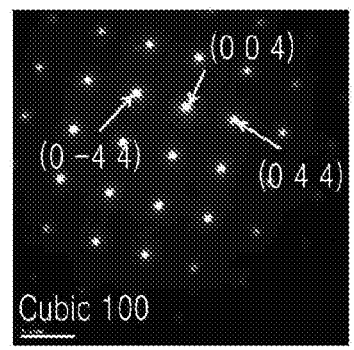
(d)
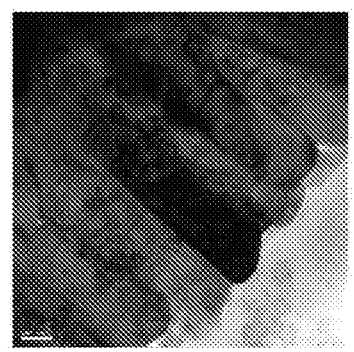
(e)
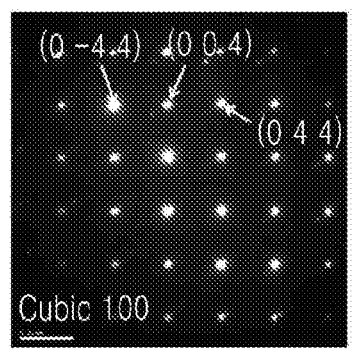
(f)

[Fig. 18b]
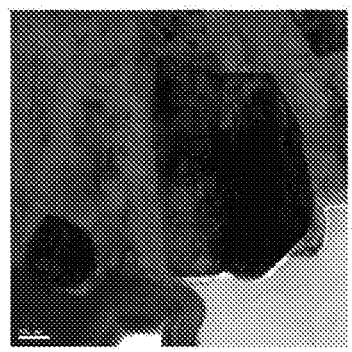
(g)
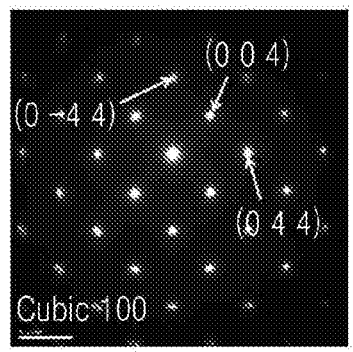
(h)
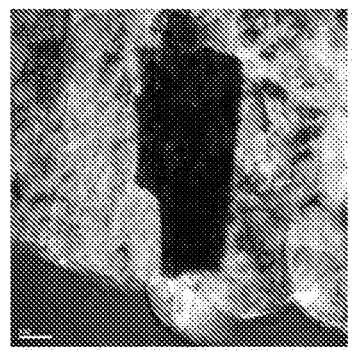
(i)
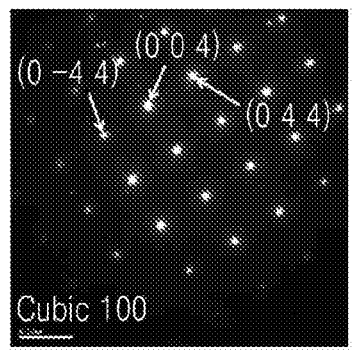
(j)
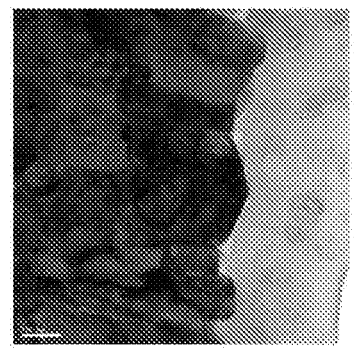
(k)
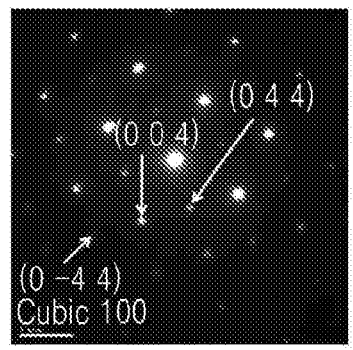
(l)

【Fig. 19】
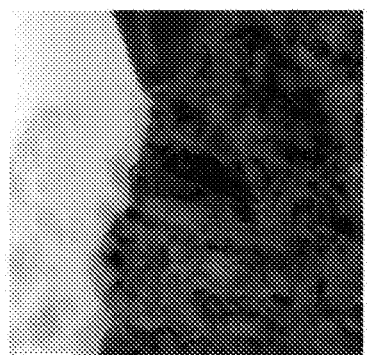
(a)
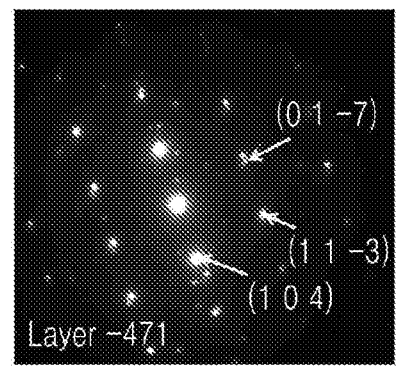
(b)
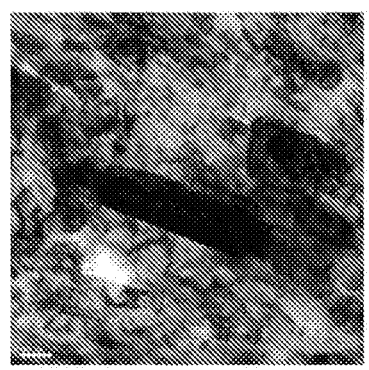
(c)
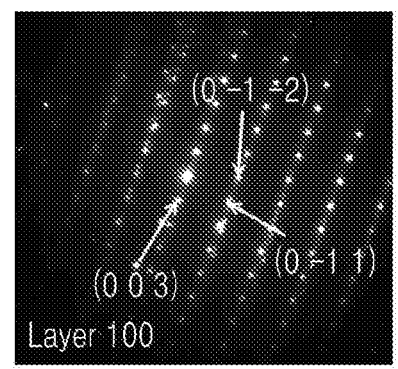
(d)
(e)
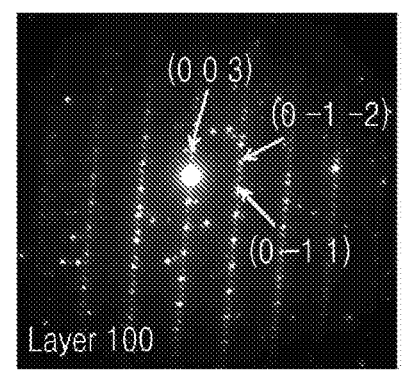
(f)

【Fig. 20a】
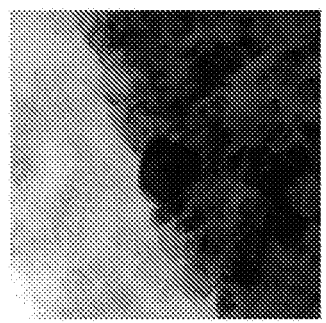
(a)
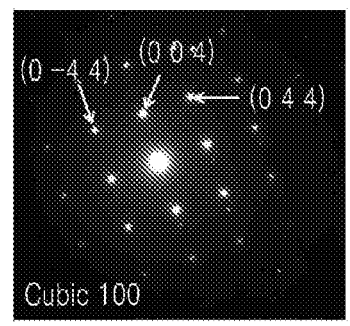
(b)
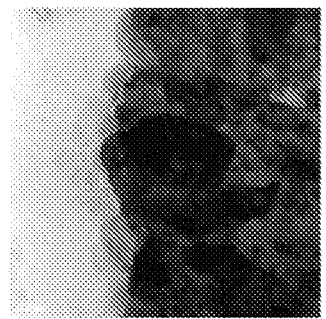
(c)
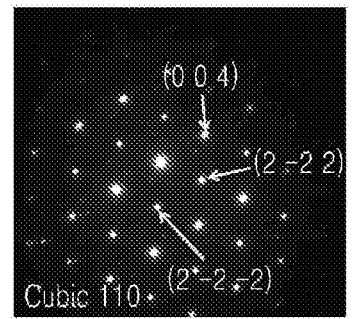
(d)
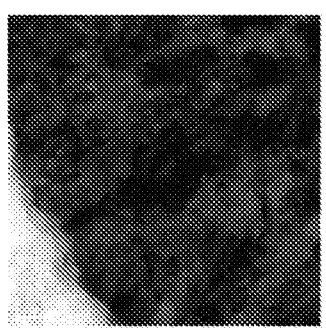
(e)
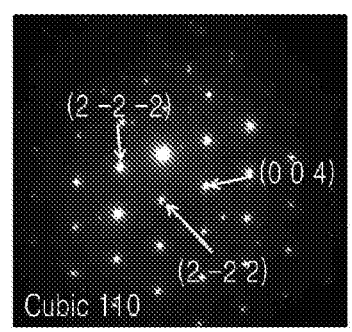
(f)
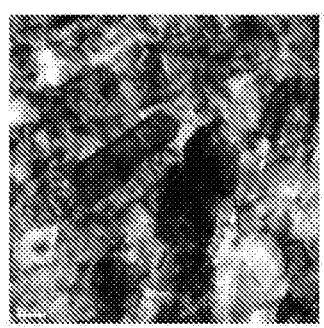
(g)
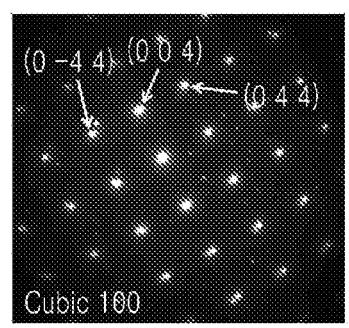
(h)

[Fig. 20b]
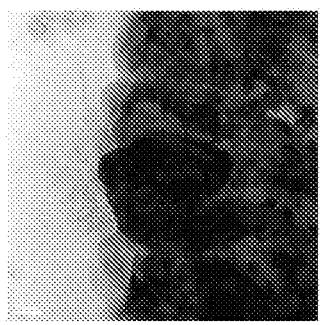
(i)
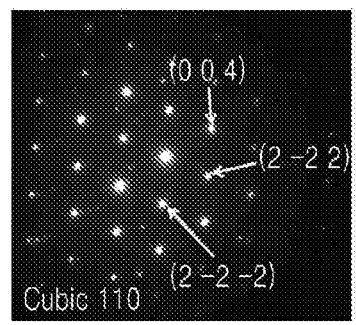
(j)
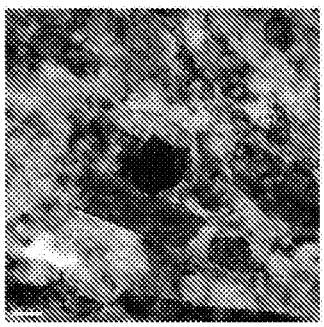
(k)
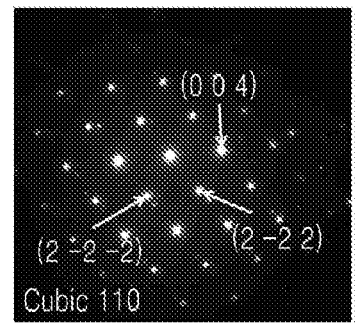
(l)
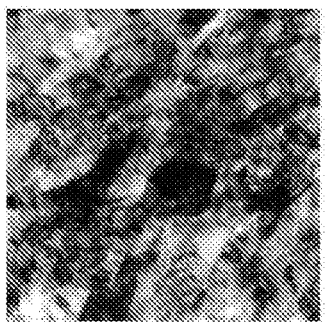
(m)
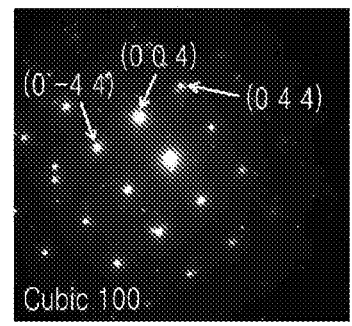
(n)
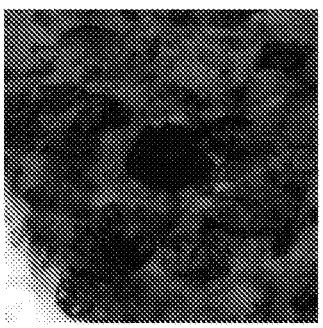
(o)
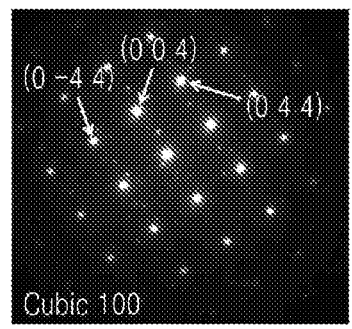
(p)

POSITIVE ELECTRODE ACTIVE MATERIAL AND RECHARGEABLE BATTERY INCLUDING THE SAME

CROSS-REFERENCE TO RELATED APPLICATION

This application is a continuation of pending International Application No. PCT/KR2016/001158, which was filed on Feb. 2, 2016 and claims priority to Korean Patent Application No. 10-2015-0016359, filed on Feb. 2, 2015, in the Korean Intellectual Property Office, the disclosures of which are hereby incorporated by reference in their entireties.

BACKGROUND

1. Field

Embodiments of the inventive concepts relate to a positive electrode active material and a rechargeable battery including the same. More particularly, embodiments of the inventive concepts relate to a positive electrode active material including a secondary particle in which primary particles having different crystal structures are agglomerated, and a rechargeable battery including the same.

2. Description of the Related Art

Lithium rechargeable batteries can have excellent energy density and power density and can be effective in reducing sizes and weights. Therefore, lithium rechargeable batteries are required as power sources of portable devices, such as notebook computers, cellular phones, and handy video cameras. In addition, lithium rechargeable batteries are attractive as power sources for load leveling of electric cars or electric power. Recently, lithium rechargeable batteries have been developed as power sources of hybrid electric cars. In particular, electric cars needs low costs, excellent stability, excellent life characteristics (particularly, under a high-temperature condition), and excellent load characteristics, and thus it is required to improve materials of lithium rechargeable batteries.

A material capable of extracting/inserting lithium ions may be used as a positive electrode active material of materials included in a lithium rechargeable battery. The material of the positive electrode active material may be various, and each of the various materials may have characteristics. In addition, the improvement of load characteristics corresponds to common challenges for improving performance of the lithium rechargeable battery, and the improvement of the material of the positive electrode active material is strongly required to improve the load characteristics. Furthermore, low-cost materials having excellent stability, life characteristics (under high-temperature) and performance balance are required.

Currently, a lithium-manganese-based composite oxide having a spinel structure, a layered lithium-nickel-based composite oxide, and a layered lithium-cobalt-based composite oxide are used as materials of the positive electrode active material for the lithium rechargeable battery. Lithium rechargeable batteries using these lithium-containing composite oxides have advantages and disadvantages in characteristics. In other words, the lithium-manganese-based composite oxide having the spinel structure is inexpensive, easily synthesized, and has excellent stability when used in a battery. However, the lithium-manganese-based composite oxide having the spinel structure has low capacity and poor high-temperature characteristics (cycle and retention). The layered lithium-nickel-based composite oxide has high capacity and excellent high-temperature characteristics but has difficulty in synthesis and poor stability in a battery. In addition, the layered lithium-nickel-based composite oxide requires caution when stored. The layered lithium-cobalt-based composite oxide is easily synthesized and provides excellent performance balance of a battery, and thus it is widely used in power sources of portable devices. However, the layered lithium-cobalt-based composite oxide has insufficient stability characteristics and is expensive.

Recently, a lithium-nickel-manganese-cobalt-based composite oxide having a layer structure has been suggested as an active material capable of minimizing or preventing the above problems of the materials of the positive electrode active material and of providing the excellent performance balance of a battery. In particular, the lithium-nickel-manganese-cobalt-based composite oxide having the layer structure is attractive as a material of the positive electrode active material, which is capable of satisfying low-cost characteristics, high-voltage characteristics, and excellent stability.

SUMMARY

Embodiments of the inventive concepts may provide a highly reliable positive electrode active material and a rechargeable battery including the same.

Embodiments of the inventive concepts may also provide a high-capacity positive electrode active material and a rechargeable battery including the same.

Embodiments of the inventive concepts may further provide a positive electrode active material with improved stability and a rechargeable battery including the same.

Embodiments of the inventive concepts may further provide a positive electrode active material with improved charge/discharge characteristics and a rechargeable battery including the same.

Embodiments of the inventive concepts may further provide a long-life positive electrode active material and a rechargeable battery including the same.

Embodiments of the inventive concepts may further include a lithium metal composite oxide having a new structure that includes a primary particle having a hexagonal crystal structure and a primary particle having a cubic crystal structure.

In an aspect, a positive electrode active material may include primary particles including a metal including at least one of Ni, Co, or Mn, and a secondary particle in which the primary particles are agglomerated. The primary particles may be formed of the same material but may have different crystal structures from each other.

In some embodiments, the primary particles may include a first type particle having a hexagonal crystal structure, and a second type particle having a cubic crystal structure.

In some embodiments, a length of the first type particle may be longer than a length of the second type particle.

In some embodiments, the lengths of the first type particle and the second type particle may be defined in a direction from a central portion of the secondary particle toward a surface portion of the secondary particle.

In some embodiments, a content ratio of the first type particle may be higher than a content ratio of the second type particle in the secondary particle.

In some embodiments, a content ratio of the second type particle may be higher than a content ratio of the first type particle in the secondary particle.

In some embodiments, a concentration of the metal may be varied in a direction from a central portion of the secondary particle toward a surface portion of the secondary particle.

In some embodiments, the secondary particle may include a concentration maintained portion in which a concentration of the metal is constant, and a concentration gradient portion which surrounds the concentration maintained portion and in which a concentration of the metal is varied in a direction from a central portion of the secondary particle toward a surface portion of the secondary particle.

In some embodiments, the secondary particle may include a first concentration gradient portion in which a concentration of the metal is varied with a first gradient in a direction from a central portion of the secondary particle toward a surface portion of the secondary particle, and a second concentration gradient portion in which a concentration of the metal is varied with a second gradient different from the first gradient in the direction from the central portion of the secondary particle toward the surface portion of the secondary particle.

In an aspect, a positive electrode active material may include primary particles including a metal including at least one of Ni, Co, or Mn, and a secondary particle in which the primary particles are agglomerated. The primary particles may include first type particles extending in a direction from a central portion of the secondary particle toward a surface portion of the secondary particle, and second type particles disposed between the first type particles and having a different crystal structure from the first type particles.

In some embodiments, the crystal structure of the first type particle may include an a-axis and a c-axis. A length of the first type particle in an a-axis direction may be longer than a length of the first type particle in a c-axis direction, and the a-axis of the first type particle may extend in the direction from the central portion of the secondary particle toward the surface portion of the secondary particle.

In an aspect, a lithium metal composite oxide may include a secondary particle formed by gathering a plurality of primary particles. The lithium metal composite oxide may include a transition metal. The primary particles may include a primary particle having a hexagonal crystal structure, and a primary particle having a cubic crystal structure.

In some embodiments, the primary particle may have a crystalline texture that is oriented in a radial direction from a central portion of the secondary particle toward a surface portion of the secondary particle.

In some embodiments, the primary particle having the cubic crystal structure may have a radial crystalline texture of which a {1,1,1} plane, on which positive ions are stacked, is oriented in a radial direction from a central portion of the secondary particle toward a surface portion of the secondary particle.

In some embodiments, the primary particle having the hexagonal crystal structure may have a crystalline texture of which a direction of an (a,b) layer surface is oriented in a radial direction from a central portion of the secondary particle toward a surface portion of the secondary particle and of which a direction of a c-layer surface is oriented in a tangential direction of the secondary particle.

In some embodiments, a content ratio of the primary particle having the cubic crystal structure in an entire portion of the secondary particle may increase as a content ratio of nickel in the entire portion of the secondary particle increases.

In an aspect, a rechargeable battery may include a positive electrode including the positive electrode active material or the lithium metal composite oxide described above, a negative electrode, and an electrolyte disposed between the positive electrode and the negative electrode.

BRIEF DESCRIPTION OF THE DRAWINGS

FIGS. 1 and 2 are views showing a positive electrode active material including a secondary particle in which primary particles are agglomerated, according to some embodiments of the inventive concepts.

FIGS. 3 and 4 are graphs for explaining a positive electrode active material including a secondary particle having a metal concentration gradient, according to some embodiments of the inventive concepts.

FIGS. 5A and 5B show transmission electron microscopy (TEM) diffraction patterns for explaining a crystal structure of a positive electrode active material manufactured according to an embodiment 1 of the inventive concepts.

FIG. 6 shows TEM diffraction patterns for explaining a crystal structure of a positive electrode active material manufactured according to an embodiment 5 of the inventive concepts.

FIG. 7 shows TEM images and TEM diffraction patterns for explaining a crystal structure of a positive electrode active material manufactured according to an embodiment 8 of the inventive concepts.

FIG. 8 shows TEM images and TEM diffraction patterns for explaining a crystal structure of a positive electrode active material manufactured according to an embodiment 9 of the inventive concepts.

FIGS. 9, 10A, and 10B show TEM images and TEM diffraction patterns for explaining a crystal structure of a positive electrode active material manufactured according to an embodiment 10 of the inventive concepts.

FIG. 11 shows a TEM image of a cross section of a positive electrode active material manufactured according to an embodiment 11 of the inventive concepts.

FIGS. 12 and 13 show TEM images and TEM diffraction patterns for explaining a crystal structure of the positive electrode active material manufactured according to the embodiment 11 of the inventive concepts.

FIGS. 14A, 14B, and 15 show TEM images and TEM diffraction patterns for explaining a crystal structure of a positive electrode active material manufactured according to an embodiment 12 of the inventive concepts.

FIG. 16 shows a TEM image of a cross section of a positive electrode active material manufactured according to an embodiment 13 of the inventive concepts.

FIGS. 17, 18A, and 18B show TEM images and TEM diffraction patterns for explaining a crystal structure of the positive electrode active material manufactured according to the embodiment 13 of the inventive concepts.

FIGS. 19, 20A, and 20B show TEM images and TEM diffraction patterns for explaining a crystal structure of a positive electrode active material manufactured according to an embodiment 14 of the inventive concepts.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

In the present specification, a description that components are formed of the same material may mean that the components include the same element but may not mean that a composition ratio of the element of one of the components is equal to that of the element of another of the components.

FIGS. 1 and 2 are views showing a positive electrode active material including a secondary particle in which primary particles are agglomerated, according to some embodiments of the inventive concepts. FIGS. 3 and 4 are graphs for explaining a positive electrode active material including a secondary particle having a metal concentration gradient, according to some embodiments of the inventive concepts.

Referring to FIGS. 1 to 4, a positive electrode active material according to some embodiments of the inventive concepts may include a secondary particle 120 in which primary particles 110 are agglomerated. An average particle diameter of the secondary particle 120 may range from 4 μm to 20 μm.

The primary particles 110 may include a metal including at least one of nickel (Ni), cobalt (Co), or manganese (Mn). In some embodiments, the primary particles 110 may include lithium (Li), Ni, Mn, and Co. In other embodiments, the primary particles 110 may include Li and Ni. In still other embodiments, the primary particles 110 may include Li, Ni, and aluminum (Al).

The primary particles 110 may be formed of the same material but may have different crystal structures from each other. In more detail, the primary particles 110 may include a first type particle 112 having a hexagonal crystal structure, and a second type particle 114 having a cubic crystal structure (e.g., a rock salt crystal structure).

In other words, the positive electrode active material according to some embodiments of the inventive concepts may be a lithium metal composite oxide formed of the secondary particle 120 which includes a transition metal and is formed by gathering a plurality of the primary particles 110. One or some of the primary particles 110 may have the hexagonal crystal structure, and another or others of the primary particles 110 may have the cubic crystal structure.

The first type particle 112 may have a relatively long length, as compared with the second type particle 114. In this case, the length of the first type particle 112 and the length of the second type particle 114 may be defined in a direction D from a central portion of the secondary particle 120 toward a surface portion of the secondary particle 120.

In other words, the primary particle 110 of the positive electrode active material including the lithium metal composite oxide according to some embodiments may have a crystalline texture that is oriented in a radial direction from the central portion of the secondary particle 120 toward the surface portion of the secondary particle 120.

The crystal structure of the first type particle 112 may include an a-axis and a c-axis. A length of the first type particle 112 in an a-axis direction may be longer than a length of the first type particle 12 in a c-axis direction, and the a-axis of the first type particle 112 may extend in the direction from the central portion of the secondary particle 120 toward the surface portion of the secondary particle 120.

In other words, the first type particle 112 having the hexagonal crystal structure may have a crystalline texture of which a direction of an (a,b) layer surface is oriented in the radial direction from the central portion of the secondary particle 120 toward the surface portion of the secondary particle 120 and of which a direction of a c-layer surface is oriented in a tangential direction of the secondary particle 120. A surface (i.e., the (a,b) layer surface) parallel to a path through which lithium moves may be oriented in the radial direction from the central portion toward the surface portion of the secondary particle 120, and thus the c-axis direction may be oriented in a direction perpendicular to the (a,b) layer surface, which may correspond to a tangential direction of a circle.

On the other hand, the second type particle 114 having the cubic crystal structure may have a radial crystalline texture of which a {1,1,1} plane on which positive ions are stacked is oriented in the radial direction from the central portion of the secondary particle 120 toward the surface portion of the secondary particle 120.

In some embodiments, a content ratio of the first type particle 112 may be higher than a content ratio of the second type particle 114 in the secondary particle 120. In other words, a large number of the primary particles 110 may include the first type particles 112 having rod shapes extending in the direction from the central portion toward the surface portion of the secondary particle 120, and the second type particles 114 having particle shapes and provided between the first type particles 112. Alternatively, the content ratio of the second type particle 114 may be higher than the content ratio of the first type particle 112 in the secondary particle 120.

In some embodiments, a concentration of a metal may be varied in the direction from the central portion of the secondary particle 120 toward the surface portion of the secondary particle 120. In this case, a concentration of the metal in the primary particle 110 may be varied in the direction from the central portion toward the surface portion of the secondary particle 120. In this case, the primary particles 110 may include the same element (e.g., Li, Ni, and O), but composition ratios of the primary particles 110 may be different from each other.

As described above, the concentration of the metal may be varied in the secondary particle 120. In some embodiments, as illustrated in FIG. 3, when the secondary particle 120 includes Ni, Co, and Mn, the secondary particle 120 may include a concentration maintained portion in which concentrations of Ni, Co, and Mn are constant, and a concentration gradient portion in which the concentration of Ni decreases and the concentrations of Co and Mn increase in the direction from the central portion of the secondary particle 120 toward the surface portion of the secondary particle 120.

In other embodiments, as illustrated in FIG. 4, when the secondary particle 120 includes Ni, Co, and Mn, the secondary particle 120 may include a first concentration gradient portion and a second concentration gradient portion, in which concentrations of the metal are varied with different gradients in the direction from the central portion of the secondary particle 120 toward the surface portion of the secondary particle 120. In more detail, in the first concentration gradient portion, the concentration of Ni may decrease with a first gradient, the concentration of Co may increase with a second gradient, and the concentration of Mn may increase with a third gradient. In the second concentration gradient portion, the concentration of Ni may decrease with a fourth gradient different from the first gradient, the concentration of Co may increase with a fifth gradient different from the second gradient, and the concentration of Mn may increase with a sixth gradient different from the third gradient.

A method of manufacturing the positive electrode active material according to the above embodiments of the inventive concepts may include an operation (a) of forming a positive electrode active material precursor for a lithium rechargeable battery by mixing and supplying an alkaline aqueous solution, a chelating agent, and a metal salt aqueous solution including nickel, cobalt, and manganese as metal salts into a reactor, an operation (b) of mixing lithium salt with the positive electrode active material precursor for the lithium rechargeable battery of the operation (a), and an operation (c) of firing the mixture of the operation (b).

In the operation (a), a growth rate of the lithium metal composite oxide may be adjusted to be 0.9 μm/h or less.

In some embodiments, the positive electrode active material formed of the lithium metal composite oxide may have a new structure that includes the first type particle 112 having the hexagonal crystal structure and the second type particle 114 having the cubic crystal structure, and the primary particle 110 may include the crystalline texture which is oriented in the radial direction from the central portion of the secondary particle 120 toward the surface portion of the secondary particle 120. Thus, lithium ions may easily move into the crystal structure. As a result, it is possible to provide the positive electrode active material capable of improving charge/discharge characteristics of the rechargeable battery.

In addition, according to some embodiments of the inventive concepts, the secondary particle 120, which consists of the primary particles 110 including the first and second type particles 112 and 114 having different crystal structures from each other, may have both an effect by the crystal structure of the first type particle 112 and an effect by the crystal structure of the second type particle 114. In more detail, the lithium ions and an electrolyte may smoothly move into the inside of the secondary particle 120 by the first type particle 112 which extends in the direction from the central portion to the surface portion of the secondary particle 120 and of which the a-axis of the crystal structure is directed in the direction from the central portion toward the surface portion of the secondary particle 120, and thus the charge/discharge characteristics can be improved. In addition, the secondary particle 120 may have high stability in terms of crystallography and improved thermal stability by the second type particle 114 having the cubic crystal structure. As a result, the charge/discharge characteristics and the stability may be improved to provide the highly reliable, high-capacity and long-life positive electrode active material and the rechargeable battery including the same.

The positive electrode active materials according to detailed embodiments of the inventive concepts described above will be described hereinafter.

Embodiments 1 to 6

Synthesis of Lithium Metal Composite Oxide 4.5 liter distilled water was provided into a co-precipitation reactor (capacity of 16 L). Thereafter, a nitrogen gas was supplied into the co-precipitation reactor at a rate of 5 liter/min to remove dissolved oxygen, and the distilled water was stirred at 500 rpm while maintaining the co-precipitation reactor at 45° C.

A metal aqueous solution (2.0M concentration) prepared by mixing nickel sulfate, cobalt sulfate, and manganese sulfate with each other at a molar ratio of 95:2.5:2.5 and an ammonia solution (10.5M concentration) were continuously provided into the reactor at a rate of 0.2 liter/hour and a rate of 0.04 liter/hour, respectively. In addition, a NaOH aqueous solution (4.0M concentration) for adjusting a pH was supplied to maintain a pH in the reactor at 11.6.

Next, an impeller speed of the reactor was adjusted to 350 rpm to perform a co-precipitation reaction. After the reaction reached a steady state, a reactant was maintained in the steady state for a predetermined time to obtain a denser co-precipitated compound.

The obtained co-precipitated compound was filtered and was cleaned by water, and then, the cleaned co-precipitated compound was dried in a hot air dryer of 110° C. for 15 hours, thereby obtaining an active material precursor $(Ni_{0.95}Co_{0.025}Mn_{0.025}(OH)_2)$.

The obtained active material precursor was mixed with lithium hydroxide (LiOH) to obtain a mixture, and the mixture was heated at a heating rate of 2° C./min and then was maintained at 500° C. for 5 hours to perform a preliminary firing process. Next, the mixture was fired at 710° C. for 15 hours to obtain $LiNi_{0.95}C0.025Mn_{0.025}O_2$.

Lithium metal composite oxides having compositions shown in the following table 1 were manufactured by the same method described above, except for adjusting the mixing ratio of nickel sulfate, cobalt sulfate, and manganese sulfate.

TABLE 1

| | Composition of lithium metal composite oxide |
|---|---|
| Embodiment 1 | $LiNi_{0.95}Co_{0.025}Mn_{0.025}O_2$ |
| Embodiment 2 | $LiNi_{0.90}Co_{0.05}Mn_{0.05}O_2$ |
| Embodiment 3 | $LiNi_{0.80}Co_{0.10}Mn_{0.10}O_2$ |
| Embodiment 4 | $LiNi_{0.70}Co_{0.20}Mn_{0.10}O_2$ |
| Embodiment 5 | $LiNi_{0.60}Co_{0.20}Mn_{0.20}O_2$ |
| Embodiment 6 | $LiNi_{0.50}Co_{0.20}Mn_{0.30}O_2$ |

Measurement of Transmission Electrode Microscopy (TEM) Image

FIGS. 5A and 5B show TEM diffraction patterns for explaining a crystal structure of the positive electrode active material manufactured according to the embodiment 1 of the inventive concepts.

Referring to FIGS. 5A and 5B, TEM images of the lithium metal composite oxide ($LiNi_{0.95}Co_{0.025}Mn_{0.025}O_2$) manufactured in the embodiment 1 were measured, and the measured results were shown in FIGS. 5A and 5B. The presence or absence of a crystalline property may be determined by the measurement of the TEM. In other words, when a spot derived from a crystalline compound is observed by the measurement of the TEM, it can be determined that the crystalline property exists.

FIG. 6 shows TEM diffraction patterns for explaining a crystal structure of the positive electrode active material manufactured according to the embodiment 5 of the inventive concepts.

Referring to FIG. 6, TEM diffraction patterns of the lithium metal composite oxide ($LiNi_{0.60}Co_{0.20}Mn_{0.20}O_2$) manufactured in the embodiment 5 were measured, and the measured results were shown in FIG. 6.

Measurement of Cubic/Layer Ratio

A ratio of particles having the cubic crystal structure to a total structure (i.e., a total particle) and a ratio of particles having the hexagonal crystal structure to the total structure were measured using the TEM data measured in the experimental embodiments, and the results were shown in the following table 2.

According to the following table 2, the ratio of the particles having the cubic crystal structure to the total particle increases as a content of nickel increases.

TABLE 2

| | Composition of lithium metal composite oxide | total | Cubic | Layer | Ratio (%) (cubic/total) |
|---|---|---|---|---|---|
| Embodiment 1 | $LiNi_{0.95}Co_{0.025}Mn_{0.025}O_2$ | 10 | 9 | 1 | 90 |
| Embodiment 2 | $LiNi_{0.90}Co_{0.05}Mn_{0.05}O_2$ | 12 | 10 | 2 | 83.3 |
| Embodiment 3 | $LiNi_{0.80}Co_{0.10}Mn_{0.10}O_2$ | 12 | 9 | 3 | 75 |
| Embodiment 4 | $LiNi_{0.70}Co_{0.20}Mn_{0.10}O_2$ | 13 | 5 | 8 | 38.5 |
| Embodiment 5 | $LiNi_{0.60}Co_{0.20}Mn_{0.20}O_2$ | 7 | 2 | 5 | 28.6 |
| Embodiment 6 | $LiNi_{0.50}Co_{0.20}Mn_{0.30}O_2$ | 11 | 3 | 8 | 27.2 |

Embodiments 7 and 8

Particle Synthesis According to Synthesis Time

Lithium metal composite oxides of embodiments 7 and 8 were manufactured by substantially the same method as the embodiment 1, except for adjusting a mixing ratio of nickel sulfate, cobalt sulfate, and manganese sulfate and except for adjusting a synthesis time to 12 hours (a particle growth rate of 0.9 μm/h) and 30 hours (a particle growth rate of 0.32 μm/h).

Specification of Particle Structure According to Synthesis Time

FIG. 7 shows TEM images and TEM diffraction patterns for explaining a crystal structure of a positive electrode active material manufactured according to an embodiment 8 of the inventive concepts.

Referring to FIG. 7, TEM images and TEM diffraction patterns of the active material particle manufactured in the embodiment 8 were measured, and the measured results were shown in FIG. 7. As shown in FIG. 7, a layered crystal structure and a cubic crystal structure are mixed.

Manufacture of Battery

Positive electrodes were manufactured using the active materials manufactured in the embodiments 7 and 8, and the positive electrodes were applied to cylindrical lithium rechargeable batteries.

Charge/discharge characteristics and life characteristics of the manufactured batteries were measured, and the measured results were shown the following table 3. A charging/discharging operation was performed 10 times on each sample under a condition of 0.2 C between 2.7V and 4.3V, and an average value of the measured values was calculated.

TABLE 3

| Sample | 30° C. | 0.1 C $1^{st}$ Discharge capacity | $1^{st}$ Efficiency | 0.2 C Capacity (mAh/g, 0.2 C/0.1 C) | 0.5 C Capacity (mAh/g, 0.5 C/0.1 C) | 0.5 C Cycle retention |
|---|---|---|---|---|---|---|
| Bulk 800515LiNO3 102%, (15), Tube, $O_2$ | 12 hr Synthesis | 206.4 mAh/g | 94.9% | 200.7 (97.2%) | 194.9 (94.4%) | 83.1% ($100^{th}$) |
| | 30 hr Synthesis | 206.8 mAh/g | 94.8% | 200.7 (97.0%) | 194.4 (94.0%) | 85.9% ($100^{th}$) |

Embodiment 9

Synthesis of Lithium Metal Composite Oxide 4.5 liter distilled water was provided into a co-precipitation reactor (capacity of 16 L). Thereafter, a nitrogen gas was supplied into the co-precipitation reactor at a rate of 5 liter/min to remove dissolved oxygen, and the distilled water was stirred at 500 rpm while maintaining the co-precipitation reactor at 45° C.

A metal aqueous solution (2.0M concentration) prepared by mixing nickel sulfate, cobalt sulfate, and manganese sulfate with each other at a molar ratio of 91:3.0:6.0 and an ammonia solution (10.5M concentration) were continuously provided into the reactor at a rate of 0.2 liter/hour and a rate of 0.04 liter/hour, respectively. In addition, a NaOH aqueous solution (4.0M concentration) for adjusting a pH was supplied to maintain a pH in the reactor at 11.6.

Thereafter, a metal aqueous solution (2.0M concentration) prepared by mixing nickel sulfate, cobalt sulfate, and manganese sulfate with each other at a molar ratio of 80:5.0:15 was mixed and supplied to form a concentration gradient portion, and then, a metal aqueous solution (2.0M concentration) prepared by mixing nickel sulfate, cobalt sulfate, and manganese sulfate with each other at a molar ratio of 55:17:28 was mixed and supplied to form a concentration gradient portion having another concentration gradient. Finally, a metal aqueous solution (2.0M concentration) prepared by mixing nickel sulfate, cobalt sulfate, and manganese sulfate with each other at a molar ratio of 80:5.0:15 was supplied to form a concentration maintained portion. As a result, a ratio of nickel:cobalt:manganese in a total portion was 71:10:19.

Next, an impeller speed of the reactor was adjusted to 350 rpm to perform a co-precipitation reaction. After the reaction reached a steady state, a reactant was maintained in the steady state for a predetermined time to obtain a denser co-precipitated compound.

The obtained active material precursor was mixed with lithium hydroxide (LiOH) to obtain a mixture, and the mixture was heated at a heating rate of 2° C./min and then was maintained at 500° C. for 5 hours to perform a preliminary firing process. Next, the mixture was fired at 850° C. for 15 hours to manufacture a compound of the embodiment 9.

Specification of Particle Structure According to Synthesis Time

FIG. 8 shows TEM images and TEM diffraction patterns for explaining a crystal structure of a positive electrode active material manufactured according to an embodiment 9 of the inventive concepts.

Referring to FIG. 8, TEM images and TEM diffraction patterns of the active material particle having the concentration gradient portion manufactured in the embodiment 9 were measured, and the measured results were shown in FIG. 8. As shown in FIG. 8, a layered crystal structure and a cubic crystal structure are mixed with each other in the active material particle having the concentration gradient portion of the embodiment 9.

Embodiment 10

Synthesis of Lithium Metal Composite Oxide

Distilled water, an ammonia aqueous solution, and caustic soda (total 10 liters) were provided into a co-precipitation reactor (capacity: 40 L, output of rotating motor: 750 W or more). Thereafter, a $N_2$ gas was supplied into the reactor at a rate of 6 liter/min, and the solutions were stirred at 350 rpm while maintaining the reactor at 45° C. Thereafter, a metal aqueous solution (2M concentration) prepared by mixing nickel sulfate and cobalt sulfate with each other at a molar ratio of 88:12 and an ammonia solution (10.5M concentration) were continuously provided into the reactor at a rate of 0.561 liter/hour and a rate of 0.128 liter/hour, respectively, thereby preparing a metal composite hydroxide $(Ni_{0.88}Co_{0.12}(OH)_2)$. In addition, a sodium hydroxide solution (4M concentration) for adjusting a pH was supplied to maintain a pH in the reactor in a range of 11 to 11.5.

The prepared metal composite hydroxide $(Ni_{0.88}Co_{0.12}(OH)_2)$ was filtered and was cleaned by water, and then, the cleaned metal composite hydroxide was dried in a vacuum dryer of 110° C. for 12 hours. The metal composite hydroxide, lithium hydroxide (LiOH), and aluminum hydroxide $(Al(OH)_3)$ were mixed with each other at a molar ratio of 0.96:1:0.04 to prepare a mixture, and the mixture was heated at a heating rate of 2° C./min and was then maintained at 450° C. for 5 hours to perform a preliminary firing process. Thereafter, the mixture was fired at a temperature of 600° C. to 800° C. for 10 hours to prepare positive electrode active material powder $(LiNi_{0.85}Co_{0.11}Al_{0.04}O_2)$.

Analysis of Crystallographical Characteristics of Particle

FIGS. 9, 10A, and 10B show TEM images and TEM diffraction patterns for explaining a crystal structure of a positive electrode active material manufactured according to an embodiment 10 of the inventive concepts.

Referring to FIGS. 9, 10A, and 10B, the positive electrode active material including Ni, Co, and Al according to the embodiment 10 includes a secondary particle in which primary particles are agglomerated, and the primary particles include a first type particle having a hexagonal crystal structure and a second type particle having a cubic crystal structure. In other words, the primary particles in which different crystal structures are mixed with each other are agglomerated to constitute the secondary particle.

Embodiment 11

Synthesis of Lithium Metal Composite Oxide 10 liter distilled water was provided into a co-precipitation reactor (capacity: 40 L, output of rotating motor: 750 W or more). Thereafter, a $N_2$ gas was supplied into the reactor at a rate of 6 liter/min, and the distilled water was stirred at 350 rpm while maintaining the reactor at 45° C. A first metal aqueous solution (2M concentration) in which a molar ratio of nickel sulfate:manganese sulfate was 98:2 was prepared. A second metal aqueous solution (2M concentration) in which a molar ratio of nickel sulfate:cobalt sulfate:manganese sulfate was 75:6:19 was prepared. The first metal aqueous solution (a supplying rate of 0.561 liter/hour) and an ammonia solution (10.5M concentration, a supplying rate of 0.128 liter/hour) were continuously supplied into the reactor for a time of 25 hours to 35 hours while mixing the first metal aqueous solution with the second metal aqueous solution at a rate of 0.561 liter/hour, thereby preparing a metal composite hydroxide in which a concentration of Ni gradually decreased and concentrations of Co and Mn gradually increased in a direction from a central portion to a surface portion. An average composition of the metal composite hydroxide was $Ni_{0.81}Co_{0.04}Mn_{0.15}(OH)_2$. In addition, a sodium hydroxide solution (4M concentration) for adjusting a pH was supplied. Ratios of nickel, cobalt, and manganese in the metal aqueous solutions used in the embodiment 11 are shown in the following table 4.

TABLE 4

| Embodiment 11 | Transition metal | | |
|---|---|---|---|
| Metal aqueous solution | Ni | Co | Mn |
| First metal aqueous solution | 98 | 0 | 2 |
| Second metal aqueous solution | 75 | 6 | 19 |

The prepared metal composite hydroxide $(Ni_{0.81}Co_{0.04}Mn_{0.15}(OH)_2)$ was filtered and was cleaned by water, and then, the cleaned metal composite hydroxide was dried in a vacuum dryer of 110° C. for 12 hours. The metal composite hydroxide and lithium hydroxide (LiOH) were mixed with each other at a molar ratio of 1:1 to prepare a mixture, and the mixture was heated at a heating rate of 2° C./min and was then maintained at 450° C. for 5 hours to perform a preliminary firing process. Thereafter, the mixture was fired at a temperature of 750° C. to 770° C. for 10 hours to prepare positive electrode active material powder $(LiNi_{0.81}Co_{0.04}Mn_{0.15}O_2)$.

Analysis of Crystallographical Characteristics of Particle

FIG. 11 shows a TEM image of a cross section of the positive electrode active material manufactured according to the embodiment 11 of the inventive concepts, and FIGS. 12 and 13 show TEM images and TEM diffraction patterns for explaining a crystal structure of the positive electrode active material manufactured according to the embodiment 11 of the inventive concepts.

Referring to FIGS. 11 to 13, the positive electrode active material including Ni, Co, and Mn according to the embodiment 11 includes a secondary particle in which primary particles are agglomerated, and the primary particles include a first type particle having a hexagonal crystal structure and a second type particle having a cubic crystal structure. In other words, the primary particles in which different crystal structures are mixed with each other are agglomerated to constitute the secondary particle.

Embodiment 12

Synthesis of Lithium Metal Composite Oxide 10 liter distilled water was provided into a co-precipitation reactor (capacity: 40 L, output of rotating motor: 750 W or more). Thereafter, a $N_2$ gas was supplied into the reactor at a rate of 6 liter/min, and the distilled water was stirred at 350 rpm while maintaining the reactor at 45° C. A first metal aqueous solution (2M concentration) in which a molar ratio of nickel sulfate:cobalt sulfate:manganese sulfate was 91:3:6 was prepared. A second metal aqueous solution (2M concentration) in which a molar ratio of nickel sulfate:cobalt sulfate:manganese sulfate was 75:6:19 was prepared. The first metal aqueous solution (a supplying rate of 0.561 liter/hour) and an ammonia solution (10.5M concentration, a supplying rate of 0.128 liter/hour) were continuously supplied into the reactor for a time of 10 hours to 15 hours while mixing the first metal aqueous solution with the second metal aqueous solution at a rate of 0.561 liter/hour. A third metal aqueous solution (2M concentration) in which a molar ratio of nickel sulfate:cobalt sulfate:manganese sulfate was 53:17:30 was prepared. The first metal aqueous solution (a supplying rate of 0.561 liter/hour) and an ammonia solution (10.5M concentration, a supplying rate of 0.128 liter/hour) were continuously supplied into the reactor for a time of 10 hours to 20 hours while mixing the mixture of the first and second metal aqueous solutions with the third metal aqueous solution at a rate of 0.561 liter/hour, thereby preparing a metal composite hydroxide including a first concentration gradient portion and a second concentration gradient portion. In the first concentration gradient portion, a concentration of Ni decreased with a first gradient, a concentration of Co increased with a second gradient, and a concentration of Mn increased with a third gradient. In the second concentration gradient portion, a concentration of Ni decreased with a fourth gradient different from the first gradient, a concentration of Co increased with a fifth gradient different from the second gradient, and a concentration of Mn increased with a sixth gradient different from the third gradient. An average composition of the metal composite hydroxide was $Ni_{0.75}Co_{0.08}Mn_{0.17}(OH)_2$. In addition, a sodium hydroxide solution (4M concentration) for adjusting a pH was supplied. Ratios of nickel, cobalt, and manganese in the metal aqueous solutions used in the embodiment 12 are shown in the following table 5.

TABLE 5

| Embodiment 12 | Transition metal | | |
| --- | --- | --- | --- |
| Metal aqueous solution | Ni | Co | Mn |
| First metal aqueous solution | 91 | 3 | 6 |
| Second metal aqueous solution | 75 | 6 | 19 |
| Third metal aqueous solution | 53 | 17 | 30 |

The prepared metal composite hydroxide ($Ni_{0.75}Co_{0.08}Mn_{0.17}(OH)_2$) was filtered and was cleaned by water, and then, the cleaned metal composite hydroxide was dried in a vacuum dryer of 110° C. for 12 hours. The metal composite hydroxide and lithium hydroxide (LiOH) were mixed with each other at a molar ratio of 1:1 to prepare a mixture, and the mixture was heated at a heating rate of 2° C./min and was then maintained at 450° C. for 5 hours to perform a preliminary firing process. Thereafter, the mixture was fired at 810° C. for 15 hours to prepare positive electrode active material powder ($LiNi_{0.75}Co_{0.08}Mn_{0.17}O_2$).

Analysis of Crystallographical Characteristics of Particle

FIGS. 14A, 14B, and 15 show TEM images and TEM diffraction patterns for explaining a crystal structure of the positive electrode active material manufactured according to the embodiment 12 of the inventive concepts.

Referring to FIGS. 14A, 14B, and 15, the positive electrode active material including Ni, Co, and Mn according to the embodiment 12 includes a secondary particle in which primary particles are agglomerated, and the primary particles include a first type particle having a hexagonal crystal structure and a second type particle having a cubic crystal structure. In other words, the primary particles in which different crystal structures are mixed with each other are agglomerated to constitute the secondary particle.

Embodiment 13

Synthesis of Lithium Metal Composite Oxide 10 liter distilled water was provided into a co-precipitation reactor (capacity: 40 L, output of rotating motor: 750 W or more). Thereafter, a $N_2$ gas was supplied into the reactor at a rate of 6 liter/min, and the distilled water was stirred at 350 rpm while maintaining the reactor at 45° C. A first metal aqueous solution (2M concentration) including nickel sulfate was prepared. A second metal aqueous solution (2M concentration) in which a molar ratio of nickel sulfate:cobalt sulfate was 92:8 was prepared. The first metal aqueous solution (a supplying rate of 0.561 liter/hour) and an ammonia solution (10.5M concentration, a supplying rate of 0.128 liter/hour) were continuously supplied into the reactor for a time of 5 hours to 10 hours while mixing the first metal aqueous solution with the second metal aqueous solution at a rate of 0.561 liter/hour. A third metal aqueous solution (2M concentration) in which a molar ratio of nickel sulfate:cobalt sulfate:manganese sulfate was 67:6:26 was prepared. The first metal aqueous solution (a supplying rate of 0.561 liter/hour) and an ammonia solution (10.5M concentration, a supplying rate of 0.128 liter/hour) were continuously supplied into the reactor for a time of 10 hours to 20 hours while mixing the mixture of the first and second metal aqueous solutions with the third metal aqueous solution at a rate of 0.561 liter/hour, thereby preparing a metal composite hydroxide including a first concentration gradient portion and a second concentration gradient portion. In the first concentration gradient portion, a concentration of Ni decreased with a first gradient, a concentration of Co increased with a second gradient, and a concentration of Mn increased with a third gradient. In the second concentration gradient portion, a concentration of Ni decreased with a fourth gradient different from the first gradient, a concentration of Co increased with a fifth gradient different from the second gradient, and a concentration of Mn increased with a sixth gradient different from the third gradient. An average composition of the metal composite hydroxide was $Ni_{0.82}Co0.06Mn_{0.12}(OH)_2$. In addition, a sodium hydroxide solution (4M concentration) for adjusting a pH was supplied. Ratios of nickel, cobalt, and manganese in the metal aqueous solutions used in the embodiment 13 are shown in the following table 6.

TABLE 6

| Embodiment 13 | Transition metal | | |
| --- | --- | --- | --- |
| Metal aqueous solution | Ni | Co | Mn |
| First metal aqueous solution | 100 | 0 | 0 |
| Second metal aqueous solution | 92 | 8 | 0 |
| Third metal aqueous solution | 67 | 6 | 26 |

The prepared metal composite hydroxide (Ni$_{0.82}$Co$_{0.06}$Mn$_{0.12}$(OH)$_2$) was filtered and was cleaned by water, and then, the cleaned metal composite hydroxide was dried in a vacuum dryer of 110° C. for 12 hours. The metal composite hydroxide and lithium hydroxide (LiOH) were mixed with each other at a molar ratio of 1:1 to prepare a mixture, and the mixture was heated at a heating rate of 2° C./min and was then maintained at 450° C. for 5 hours to perform a preliminary firing process. Thereafter, the mixture was fired at 750° C. for 15 hours to prepare positive electrode active material powder (LiNi$_{0.82}$Co$_{0.06}$Mn$_{0.12}$O$_2$).

Analysis of Crystallographical Characteristics of Particle

FIG. 16 shows a TEM image of a cross section of the positive electrode active material manufactured according to the embodiment 13 of the inventive concepts, and FIGS. 17, 18A, and 18B show TEM images and TEM diffraction patterns for explaining a crystal structure of the positive electrode active material manufactured according to the embodiment 13 of the inventive concepts.

Referring to FIGS. 16, 17, 18A, and 18B, the positive electrode active material including Ni, Co, and Mn according to the embodiment 13 includes a secondary particle in which primary particles are agglomerated, and the primary particles include a first type particle having a hexagonal crystal structure and a second type particle having a cubic crystal structure. In other words, the primary particles in which different crystal structures are mixed with each other are agglomerated to constitute the secondary particle.

Embodiment 14

Synthesis of Lithium Metal Oxide 10 liter distilled water was provided into a co-precipitation reactor (capacity: 40 L, output of rotating motor: 750 W or more). Thereafter, a N$_2$ gas was supplied into the reactor at a rate of 6 liter/min, and the distilled water was stirred at 350 rpm while maintaining the reactor at 45° C. A nickel sulfate aqueous solution (2M concentration, a supplying rate of 0.561 liter/hour) and an ammonia solution (10.5M concentration, a supplying rate of 0.128 liter/hour) were continuously provided into the reactor for a time of 25 hours to 35 hours to prepare a metal composite hydroxide (Ni(OH)$_2$). In addition, a sodium hydroxide solution (4M concentration) for adjusting a pH was supplied.

The prepared metal composite hydroxide (Ni(OH)$_2$) was filtered and was cleaned by water, and then, the cleaned metal composite hydroxide was dried in a vacuum dryer of 110° C. for 12 hours. The metal composite hydroxide and lithium hydroxide (LiOH) were mixed with each other at a molar ratio of 1:1 to prepare a mixture, and the mixture was heated at a heating rate of 2° C./min and was then maintained at 450° C. for 5 hours to perform a preliminary firing process. Thereafter, the mixture was fired at 650° C. for 10 hours to prepare positive electrode active material powder (LiNiO$_2$).

Analysis of Crystallographical Characteristics of Particle

FIGS. 19, 20A, and 20B show TEM images and TEM diffraction patterns for explaining a crystal structure of the positive electrode active material manufactured according to the embodiment 14 of the inventive concepts.

Referring to FIGS. 19, 20A, and 20B, the positive electrode active material formed of LiNiO$_2$ according to the embodiment 14 includes a secondary particle in which primary particles are agglomerated, and the primary particles include a first type particle having a hexagonal crystal structure and a second type particle having a cubic crystal structure. In other words, the primary particles in which different crystal structures are mixed with each other are agglomerated to constitute the secondary particle.

The positive electrode active material and the rechargeable battery including the same according to embodiments of the inventive concepts may be used in various electronic devices, such as electric cars, portable mobile devices, and energy storage devices.

The positive electrode active material according to embodiments of the inventive concepts may include the secondary particle in which the primary particles are agglomerated. The primary particles may include the first type particle having a first crystal structure and the second type particle having a second crystal structure different from the first crystal structure. Thermal, mechanical and chemical stability and charge/discharge characteristics of the rechargeable battery may be improved by the positive electrode active material including the secondary particle in which the primary particles having different crystal structures are agglomerated.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A positive electrode active material comprising:
    primary particles including a metal including at least one of Ni, Co, or Mn; and
    a secondary particle in which the primary particles are agglomerated,
    wherein the primary particles are formed by particles having different crystal structure, but made of the same material.

2. The positive electrode active material of claim 1, wherein the primary particles comprise:
    a first type particle having a hexagonal crystal structure; and
    a second type particle having a cubic crystal structure.

3. The positive electrode active material of claim 2, wherein a length of the first type particle is longer than a length of the second type particle.

4. The positive electrode active material of claim 3, wherein the lengths of the first type particle and the second type particle are defined in a direction from a central portion of the secondary particle toward a surface portion of the secondary particle.

5. The positive electrode active material of claim 2, wherein a content ratio of the first type particle is higher than a content ratio of the second type particle in the secondary particle.

6. The positive electrode active material of claim 2, wherein a content ratio of the second type particle is higher than a content ratio of the first type particle in the secondary particle.

7. The positive electrode active material of claim 1, wherein a concentration of the metal is varied in a direction from a central portion of the secondary particle toward a surface portion of the secondary particle.

8. The positive electrode active material of claim 1, wherein the secondary particle comprises:
a concentration maintained portion in which a concentration of the metal is constant; and
a concentration gradient portion which surrounds the concentration maintained portion and in which a concentration of the metal is varied in a direction from a central portion of the secondary particle toward a surface portion of the secondary particle.

9. The positive electrode active material of claim 1, wherein the secondary particle comprises:
a first concentration gradient portion in which a concentration of the metal is varied with a first gradient in a direction from a central portion of the secondary particle toward a surface portion of the secondary particle; and
a second concentration gradient portion in which a concentration of the metal is varied with a second gradient different from the first gradient in the direction from the central portion of the secondary particle toward the surface portion of the secondary particle.

10. A positive electrode active material comprising:
primary particles including a metal including at least one of Ni, Co, or Mn; and
a secondary particle in which the primary particles are agglomerated,
wherein the primary particles comprise:
first type particles extending in a direction from a central portion of the secondary particle toward a surface portion of the secondary particle; and
second type particles disposed between the first type particles and having a different crystal structure from the first type particles,
wherein the crystal structure of the first type particle includes an a-axis and a c-axis,
wherein a length of the first type particle in an a-axis direction is longer than a length of the first type particle in a c-axis direction, and
wherein the a-axis of the first type particle extends in the direction from the central portion of the secondary particle toward the surface portion of the secondary particle.

11. A lithium metal composite oxide comprising:
a secondary particle formed by gathering a plurality of primary particles,
wherein the lithium metal composite oxide includes a transition metal, and
wherein the primary particles comprise: a primary particle having a hexagonal crystal structure; and a primary particle having a cubic crystal structure,
wherein the primary particle having the cubic crystal structure has a radial crystalline texture of which a $\{1,1,1\}$ plane, on which positive ions are stacked, is oriented in a radial direction from a central portion of the secondary particle toward a surface portion of the secondary particle.

12. The lithium metal composite oxide of claim 11, wherein the primary particle has a crystalline texture that is oriented in a radial direction from a central portion of the secondary particle toward a surface portion of the secondary particle.

13. The lithium metal composite oxide of claim 11, wherein the primary particle having the hexagonal crystal structure has a crystalline texture of which a direction of an (a,b) layer surface is oriented in a radial direction from a central portion of the secondary particle toward a surface portion of the secondary particle and of which a direction of a c-layer surface is oriented in a tangential direction of the secondary particle.

14. The lithium metal composite oxide of claim 11, wherein a content ratio of the primary particle having the cubic crystal structure in an entire portion of the secondary particle increases as a content ratio of nickel in the entire portion of the secondary particle increases.

15. A rechargeable battery comprising:
a positive electrode including the positive electrode active material of claim 1;
a negative electrode; and
an electrolyte disposed between the positive electrode and the negative electrode.

16. A rechargeable battery comprising:
a positive electrode including the positive electrode active material of claim 10;
a negative electrode; and
an electrolyte disposed between the positive electrode and the negative electrode.

17. A rechargeable battery comprising:
a positive electrode including the lithium metal composite oxide of claim 11;
a negative electrode; and
an electrolyte disposed between the positive electrode and the negative electrode.

* * * * *